United States Patent
Haub et al.

(10) Patent No.: US 8,060,483 B2
(45) Date of Patent: *Nov. 15, 2011

(54) METHOD FOR INDEXING FILE STRUCTURES IN AN ENTERPRISE DATA SYSTEM

(75) Inventors: Andreas Peter Haub, Roetgen (DE); Stefan Romainczyk, Aachen (DE); Ralf Deininger, Aachen (DE); Helmut Helpenstein, Erkelenz (DE); Andreas Krantz, Zulpich (DE); Myrle Krantz, Aachen (DE)

(73) Assignee: National Instruments Corporation, Austin, TX (US)

( * ) Notice: Subject to any disclaimer, the term of this patent is extended or adjusted under 35 U.S.C. 154(b) by 419 days.

This patent is subject to a terminal disclaimer.

(21) Appl. No.: 11/461,627

(22) Filed: Aug. 1, 2006

(65) Prior Publication Data

US 2007/0038592 A1 Feb. 15, 2007

Related U.S. Application Data

(60) Provisional application No. 60/708,225, filed on Aug. 15, 2005.

(51) Int. Cl.
*G06F 17/30* (2006.01)

(52) U.S. Cl. ........ 707/705; 707/736; 707/769; 707/770; 707/741

(58) Field of Classification Search .............. 707/3, 705, 707/736, 769–770, 741
See application file for complete search history.

(56) References Cited

U.S. PATENT DOCUMENTS

| | | | |
|---|---|---|---|
| 5,983,164 A | 11/1999 | Ocondi | |
| 6,008,806 A * | 12/1999 | Nakajima et al. | 715/744 |
| 6,032,159 A | 2/2000 | Rivlin | |
| 6,173,287 B1 | 1/2001 | Eberman | |
| 6,260,043 B1 * | 7/2001 | Puri et al. | 1/1 |
| 6,263,330 B1 | 7/2001 | Bessette | |
| 6,401,097 B1 | 6/2002 | McCotter et al. | |
| 6,502,086 B2 | 12/2002 | Pratt | |
| 6,665,836 B1 | 12/2003 | Wynblatt et al. | |
| 6,708,189 B1 * | 3/2004 | Fitzsimons et al. | 707/205 |
| 6,799,143 B1 * | 9/2004 | Frerichs et al. | 702/179 |

(Continued)

FOREIGN PATENT DOCUMENTS

GB 2 400 943 A 10/2004

OTHER PUBLICATIONS

Bott et al., Microsoft Windows XP Inside Out Deluxe, Second Edition, Oct. 6, 2004, p. 679-681, ISBN 978-0-7356-2043-8.*

(Continued)

*Primary Examiner* — Frantz Coby
(74) *Attorney, Agent, or Firm* — Meyertons Hood Kivlin Kowert & Goetzel, P.C.; Jeffrey C. Hood

(57) ABSTRACT

A method and system is presented which provides a TDM framework for managing self-describing measurement data. The TDM framework provides applications with a central platform for accessing measurement data across an entire enterprise system. By means of individual plug-ins, which are specific to a given data file format, meta-data for each data store in the enterprise may be indexed in a unified manner. The unified indexing, in turn, provides the ability to browse and query the indexed measurement data without requiring the opening or reading from a source data file.

17 Claims, 15 Drawing Sheets

U.S. PATENT DOCUMENTS

| | | | |
|---|---|---|---|
| 6,934,766 | B1 | 8/2005 | Russell |
| 6,959,416 | B2 | 10/2005 | Manning et al. |
| 6,981,002 | B2 | 12/2005 | Nunez |
| 7,003,737 | B2 | 2/2006 | Chiu et al. |
| 7,054,927 | B2 | 5/2006 | Ulrich et al. |
| 7,895,191 | B2* | 2/2011 | Colossi et al. ............... 707/717 |
| 2003/0028344 | A1* | 2/2003 | Pierce et al. ............... 702/127 |
| 2003/0061195 | A1 | 3/2003 | Laborde et al. |
| 2003/0105811 | A1 | 6/2003 | Laborde et al. |
| 2003/0154192 | A1* | 8/2003 | Laborde et al. ............... 707/3 |
| 2003/0161499 | A1* | 8/2003 | Svendsen et al. ............ 382/102 |
| 2004/0054676 | A1* | 3/2004 | McNally et al. ............. 707/100 |
| 2004/0193599 | A1* | 9/2004 | Liu et al. ............... 707/7 |
| 2005/0010454 | A1 | 1/2005 | Falk et al. |
| 2005/0027750 | A1* | 2/2005 | Martin et al. ............... 707/200 |
| 2005/0083413 | A1* | 4/2005 | Reed et al. ............... 348/211.99 |
| 2005/0091287 | A1* | 4/2005 | Sedlar ............... 707/200 |
| 2006/0101204 | A1* | 5/2006 | Bao ............... 711/114 |
| 2006/0112116 | A1 | 5/2006 | McConnell |

OTHER PUBLICATIONS

C. Mic Bowman, Chanda Dharap, Mrinal Baruah, Bill Camargo and Sunil Potti; "A File System for Information Management"; Proceedings of the ISMM International Conference on Intelligent Information Management Systems; Jun. 1994; 6 pages.

F. J. Smith and L. C. Emerson; "Indexing Technical Data in a Materials Database"; Second International Conference on Data and Knowledge Systems for Manufacturing and Engineering; Oct. 1989; pp. 12-18.

European search report for application No. EP 06 01 6944 mailed Nov. 24, 2006.

Francis R Bretherton and Paul T. Singley; "Metadata: A User's View"; Seventh International Working Conference on Scientific and Statistical Database Management; Sep. 1994; pp. 166-174.

Sohail Gani and Phil Picuri; "The object revolution How COM technology is changing the way we do business"; Computing & Control Engineering Journal; Jun. 1995; pp. 108-112.

Ralph Kimball; "The Data Warehouse Toolkit Practical Techniques for Building Dimensional Data Warehouses"; 1996; pp. 220-221, and 257-268; John Wiley & Sons, Inc.

Juan Manuel Ramierez and David Baez-Lopez; "An Experimental Simulation Lab in MathCAD for Teaching Signal Processing"; Sixth IEEE Digital Signal Processing Workshop; Oct. 1994; pp. 123-126.

"DIAdem—Data—ASAM Data Navigator"; 2001; 3 pages; National Instruments Corp.; Austin, TX.

Dipl.-Ing. Thorsten Mayer; "Technical Data Management for the Software of National Instruments"; Jan. 30, 2001, 13 pages.

"A Stable Basis—New ASAM—conform DataCache"; DIAgraph; Jan. 1998, (Translation of the DIAgraph article on page 2 entitled "MIT Solider Basis—Neue ASAM-Konforme Datenbasis", original article attached); 3 pages.

Tom Ferraro; "DIAdem 10.0 DataFinder Revolutionizes Test Data Search"; Instrumentation Newsletter; Q1, 2006; 2 pages; National Instruments Corp.; Austin, TX.

"Getting Started with DIAdem"; Jul. 2004; 43 pages; National Instruments Corp.; Austin, TX.

* cited by examiner

METHOD FOR INDEXING FILE STRUCTURES IN AN ENTERPRISE DATA SYSTEM

CROSS-REFERENCE TO RELATED APPLICATIONS

The present application claims priority under 35 U.S.C. 119(e) to U.S. Provisional Patent Application Ser. No. 60/708,225 filed on Aug. 15, 2005, which is hereby incorporated by reference in its entirety as though fully and completely set forth herein.

BACKGROUND OF THE INVENTION

1. Field of the Invention

The present invention relates generally to computer software. More particularly, the present invention relates to software for processing measurement data.

2. Description of the Relevant Art

Technical Data Management (TDM) may include a large collection of functionality and operations performed by different applications and services in handling, processing and managing technical data from measurements, from simulations, and from various other technical data processing activities. The applications and services involved in TDM are typically within the operations of an engineering or scientific enterprise, or other organizational entity. The operations may include a wide variety of workflow processes related to technical data, including:

storing and retrieving technical data
exploring, searching and filtering technical datasets
managing and maintaining technical data stores
transmitting technical data to remote users
importing and exporting technical data from foreign systems
supporting network operations for TDM.

Thus, the operational requirements associated with Technical Data Management represent a very complex organizational problem, whose solution has involved the use of numerous components and technologies, and whose challenge has involved the integration of those components and technologies.

The field of Technical Data Management (TDM) may specifically include computer-based tools for acquiring, storing, and retrieving measurement data. As used herein, measurement data may represent a type of technical data acquired by a test and measurement application, e.g., via test and measurement hardware, such as data acquisition (DAQ) hardware or other hardware. In TDM involving measurements, it may be useful to store descriptive meta-data, which is associated with a given set of measurement data. One previous method for managing the complexity of TDM measurements has bundled the meta-data and the measurement data to provide self-describing measurement data.

For example, the Open Data Services (ODS) standard of the Association for Standardization of Automation and Measuring Systems (ASAM) specifies details for representations of the measurement and description data is used in the automotive industry. ASAM-ODS generally defines a data model architecture (a method to describe the organization of data in a data source) and general methods to access data sources. An ATF (ASAM Transport Format) file, which is an ASCII representation of the ASAM-ODS data and data model, facilitates the exchange of data between different ASAM-ODS storage systems or other external systems. Measurement data (bulk data) can also be stored in binary files and linked to the ATF file.

Although the example of ASAM-ODS shows that some degree of standardizing the storage of meta-data among various applications is possible in one industry, there is little historical precedent indicating that any single standard data format, even if it were a self-describing format, could ever be widely adopted. The sheer volume and diversity of existing applications that process measurement data would involve an astronomical task of migration to any one standard, assuming such a standard could ever be agreed upon. Many operators of application programs would experience no benefits from a potential migration, but would incur major costs and disruption of their routine operations. Thus, the present situation, wherein various data formats are used by many different applications, is expected to reflect the future development of TDM.

Even if a single self-describing data format was adopted, TDM solutions for storing self-describing measurement data may have several drawbacks. For example, in distributed computer systems having multiple networked computers, finding the location of the stored data may be troublesome. In addition, the data format(s) of the stored data may vary or may not adhere to a given standard or policy defined for the organization. Resolving such issues, if at all possible, may often require customized programming for each application accessing the stored data. As customized code becomes increasingly necessary for integrating various components, TDM solutions tend to become systems that are expensive and time consuming to develop, that are difficult to maintain and use, and that do not scale efficiently.

Various TDM applications (such as those available from National Instruments Corporation) may be used to acquire and store measurements, or retrieve measurements from a data store for analysis and visualization. As noted above, the way TDM is often performed, each application is independently responsible for storing and retrieving data, usually in a different data format. In this type of environment, enterprise applications may concurrently access data stores which contain the measurement data. The various TDM applications can read and write to similar storage mechanisms such as files or databases.

While it is possible to build TDM solutions with common data stores, current implementations burden the developer of the application (for acquiring, visualizing, and analyzing measurement data) with the responsibility of maintaining a consistent data representation. In these kinds of TDM solutions, the various enterprise applications accessing a given data store must share an understanding of how the measurement data is represented, in turn requiring additional coordination and management effort that must be distributed among a large number of individual applications. As a result, these TDM methods, which involve applications directly accessing measurement data stores, may be difficult to scale across enterprise systems, because the responsibility for coordination and maintenance cannot be centrally enforced in a reliable, cost-effective manner that satisfies all individual requirements.

SUMMARY

One embodiment comprises a method for indexing measurement data. The method may comprise first storing measurement data in a plurality of data files in an enterprise system. The stored measurement data may include meta-data associated with the measurement data, wherein the meta-data describes characteristics of the measurement data. One or more plug-ins associated with a file type of the data file may be identified.

For each respective one of the one or more plug-ins, the method for indexing may include performing several additional steps. An attempt to extract the meta-data from the data file using the respective plug-in may be performed. A successful attempt may comprise receiving the meta-data from the respective plug-in. Additionally, in response to a successful attempt, a first plug-in from said plurality of plug-ins may be associated with the data file. The file type may at least be determined by a file extension. In response to a successful attempt, the first plug-in may also be associated with the file type of the data file.

The method for indexing may further include an embodiment wherein an unsuccessful attempt comprises receiving an error message from the respective plug-in.

In addition, the data file type for the data file may be identified by a data file type being associated with the selected plug-in. Descriptive information from the meta-data of the data file may be then retrieved by the indexing data plug-in. The descriptive information may be stored in a meta-data database index by the indexing data plug-in, and may also be stored in a meta-data text index by the indexing data plug-in.

In response to a respective plurality of successful attempts, the method for indexing may still further comprise embodiments wherein a plurality of plug-ins are associated with the data file. A successful attempt may includes validating the file type of the data file, wherein the contents of the data file are read by the one of the one or more plug-ins.

One embodiment comprises a method for storing and retrieving measurement data. A query for the measurement data may be received, wherein the query includes parameters of meta-data associated with the measurement data. In response to the query, the method may search an index of the plurality of data files according to the query. The index was preferably previously created according to the meta-data.

In searching the index, a plug-in associated with the file type of each data file may be used to retrieve meta-data from each data file. More specifically, the method may determine a match in the index according to the query and select a first plug-in associated with a first data file. The selected first plug-in may be used to retrieve first measurement data from the first data file according to the query. The method may further select a second plug-in associated with a second data file, and the second plug-in may retrieve second measurement from the second data file data according to the query.

The meta-data may comprise a hierarchical data model including a file/root level, a group/type/setup level, and a signal/channel/trace level. The file/root level of meta-data may include timestamp information for the measurement data, an owner of the measurement data, a name of the file/root, type of the file/root, a format of the file/root, or a path/location of the file/root. The group/type/setup level of meta-data may include a type of measurement of the group/type/setup, a description of the type of measurement, an operator of the group/type/setup, a recommended type of analysis/post-processing for the group/type/setup, a reference to another document describing the measurement setup/channel list in the group/type/setup, or a measurement setup/channel list in the group/type/setup. The signal/channel/trace level of meta-data may include a name of the signal/channel/trace, an engineering unit for the signal/channel/trace, a description of the engineering unit, a description of the signal/channel/trace, a unique ID for the signal/channel/trace, a unique ID for the sensor/transducer measuring the signal/channel/trace, an image of the signal/channel/trace, or a set of data points included in the signal/channel/trace.

In various embodiments, the query may be received in response to user input specifying the conditions of the query. The query may also be received in response to an application issuing a request, wherein the request includes a specification of the conditions of the query.

In one embodiment, a method for browsing measurement data may comprise receiving user input for browsing at least one first data file of the first plurality of data files. The method may further include retrieving and displaying meta-data from the index corresponding to the at least one first data file in response to the user input, wherein the at least one first data file is not opened during said retrieving and displaying. In addition, a hierarchical view, which contains at least a subset of the first plurality of data files, may be displayed.

A second plurality of data files may be stored in the enterprise system, wherein the second plurality of data files comprise non-measurement data and meta-data associated with the non-measurement data. The meta-data may also describe characteristics of the non-measurement data. A hierarchical view, which contains at least a subset of the first plurality of data files and at least a subset of the second plurality of data files, may be displayed. The method may more specifically include embodiments wherein receiving user input for browsing may comprise receiving user input to the hierarchical view.

The index may further include a portion of measurement data from each of the first plurality of data files. In some embodiments, displaying the hierarchical view may be performed in response to user input specifying criteria limiting the measurement data displayed in the hierarchical view. The user input specifying criteria limiting the measurement data displayed may further be associated with measurement data stored in two or more data files. At least two of the two or more data files may be stored as a different file type. The index may still further include a portion of measurement data from one or more channels stored in one or more of the plurality of data files.

Other embodiments are also disclosed, such as a computer system including a memory, a processor, and computer-readable code stored on said memory and processable by said processor for implementing storing and retrieving measurement data according to the methods described herein. The computer system embodiment for implementing storing and retrieving measurement data may also display the results of a query to a user. In another embodiment, a computer system including a memory, a processor, and computer-readable code stored on said memory and processable by said processor may implement indexing measurement data according to the methods described herein. In yet another embodiment, a computer system including a memory, a processor, and computer-readable code stored on said memory and processable by said processor may implement browsing measurement data according to the methods described herein.

Another embodiment is represented by a memory medium including program instructions executable to implement a method for storing and retrieving measurement data according to the methods described herein. In another embodiment, a memory medium may include program instructions executable to implement a method for indexing measurement data according to the methods described herein. In yet another embodiment, a memory medium may include program instructions executable to implement a method for browsing measurement data according to the methods described herein.

BRIEF DESCRIPTION OF THE DRAWINGS

Other objects and advantages of the invention will become apparent upon reading the following detailed description and upon reference to the accompanying drawings in which.

Figure 1:
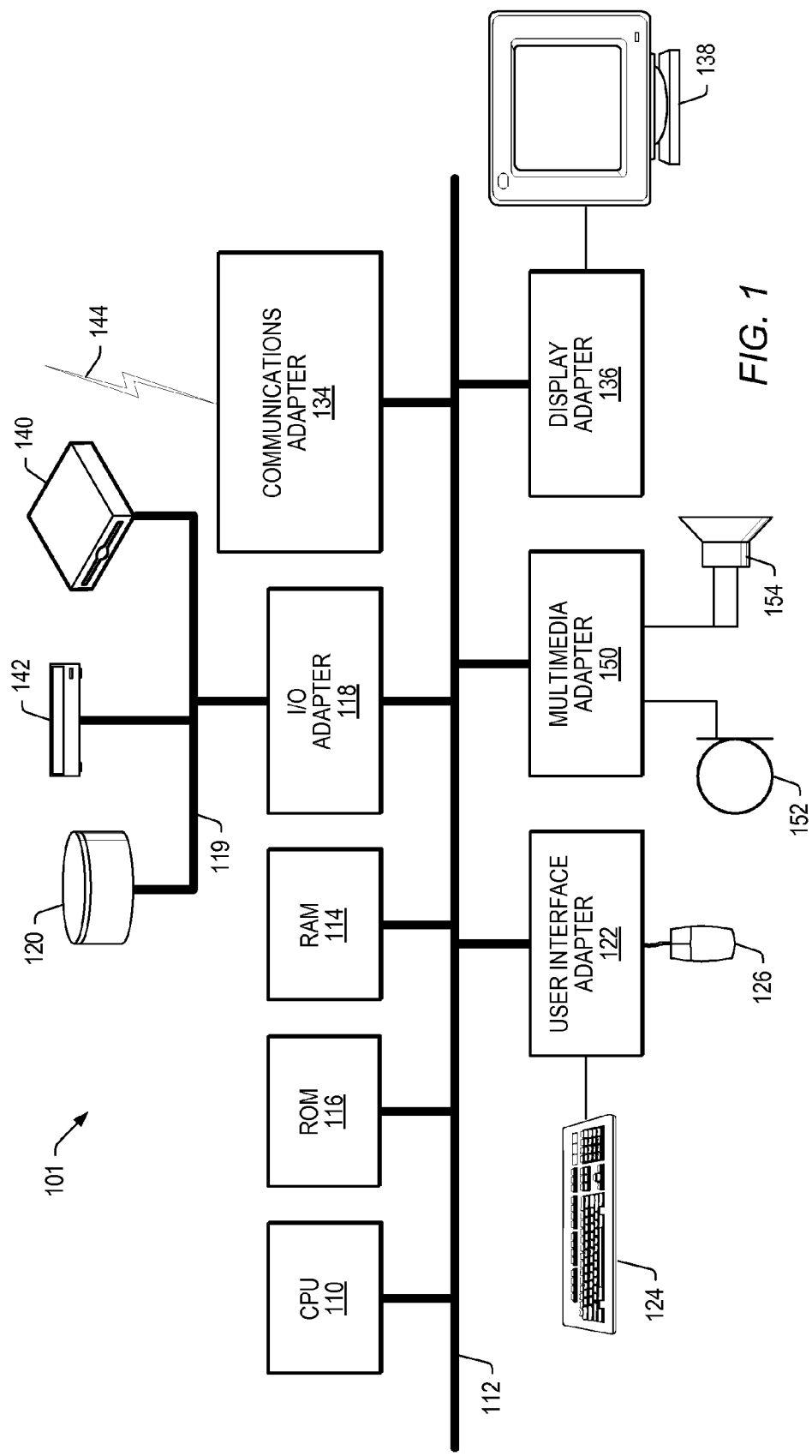
FIG. 1 illustrates a computer system according to one embodiment.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. Patent Publication No. 2003/0105811 A1 (Ser. No. 10/137,669) titled "Networked Data Stores for Measurement Data," filed May 2, 2002, whose inventors are Guy Vachon Laborde, David M. Pierce, Andreas Peter Haub, Stefan Romainczyk, and Helmut J. Helpenstein; U.S. Patent Publication No. 2003/0061195 A1 (Ser. No. 10/137,717) titled "Technical Data Management (TDM) Framework For TDM Applications," filed May 2, 2002, whose inventors are Guy Vachon Laborde, Andreas Peter Haub, Stefan Romainczyk, and Helmut J. Helpenstein; and U.S. Patent Publication No. 2003/0154192 A1 (Ser. No. 10/137,723) titled "Optimized Storage for Measurement Data," filed May 2, 2002, whose inventors are Guy Vachon Laborde, David M. Pierce, Andreas Peter Haub, Stefan Romainczyk, and Helmut J. Helpenstein-are hereby incorporated by reference in their entirety as though fully and completely set forth herein.

Computer System Platform

A representative hardware platform for practicing the methods described herein is depicted in FIG. 1, which illustrates an exemplary hardware configuration of a computer system 101 The computer system 101 may execute computer programs which may be stored on volatile or non-volatile memory. In various embodiments, the computer system 101 may comprise a desktop computer, a laptop computer, a palm-top computer, a network computer, a personal digital assistant (PDA), an embedded device, a smart phone, or any other suitable computing device.

The computer system 101 includes at least one central processing unit (CPU) or other processor(s) 110, such as a conventional microprocessor, and a number of other units interconnected via system bus 112. The CPU 110 may include other circuitry not shown herein, which will include circuitry commonly found within a microprocessor, e.g., execution unit, bus interface unit, arithmetic logic unit, etc. The CPU 110 may be coupled to a memory medium, which may include random access memory (RAM) 114, read only memory (ROM) 116, and input/output (I/O) adapter 118 for connecting peripheral devices. The peripheral devices to adapter 118 may be disk units 120, tape drives 140, optical drives 142 which may be connected via peripheral bus 119 to main bus 112, in one embodiment. The CPU 110 may be configured to execute program instructions which implement the system and methods described herein.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium may therefore store program instructions and/or data which implement the methods described herein. Furthermore, the memory medium may be utilized to install the program instructions and/or data.

In a further embodiment, the memory medium may be comprised in a second computer system which is coupled to a first computer system through a network. In this instance, the second computer system may operate to provide the program instructions stored in the memory medium through the network to the first computer system for execution.

The data processing network 144 may be a wireless, galvanic wired, or optical media network with a star, ring, or other topology. The network 144 may be representative of various types of possible networks: for example, a local area network (LAN), wide area network (WAN), or the Internet. The systems and methods described herein may be implemented in various embodiments on a plurality of heterogeneous or homogeneous networked computer systems, such as exemplary computer system 101, through one or more networks.

In various embodiments, the CPU 110 may also be coupled through an input/output bus 112 to one or more input/output devices via one or more adapters. Thus, computer system 101 also may include user interface adapter 122 for connecting keyboard 124, mouse 126, and/or other user interface devices such as a touch screen device (not shown) to bus 112. Further included in computer system 101 may be communication adapter 134 for connecting data processing bus 112 to a data processing network 144, and display adapter 136 for connecting bus 112 to display device 138.

Yet further included in computer system 101 may be multimedia adapter 150 for connecting bus 112 to microphone 152 and loudspeaker system 154; other types of multimedia output and input devices, such as headphones and stereo speakers (not shown), may be used via analog or digital interfaces with adapter 150. In various embodiments, computer system may also include a track ball, a magnetic or paper tape reader, a tablet, a stylus, a voice recognizer, a handwriting recognizer, a printer, a plotter, a scanner, and any other devices for input and/or output.

Distributed Computing Environment

Figure 2:
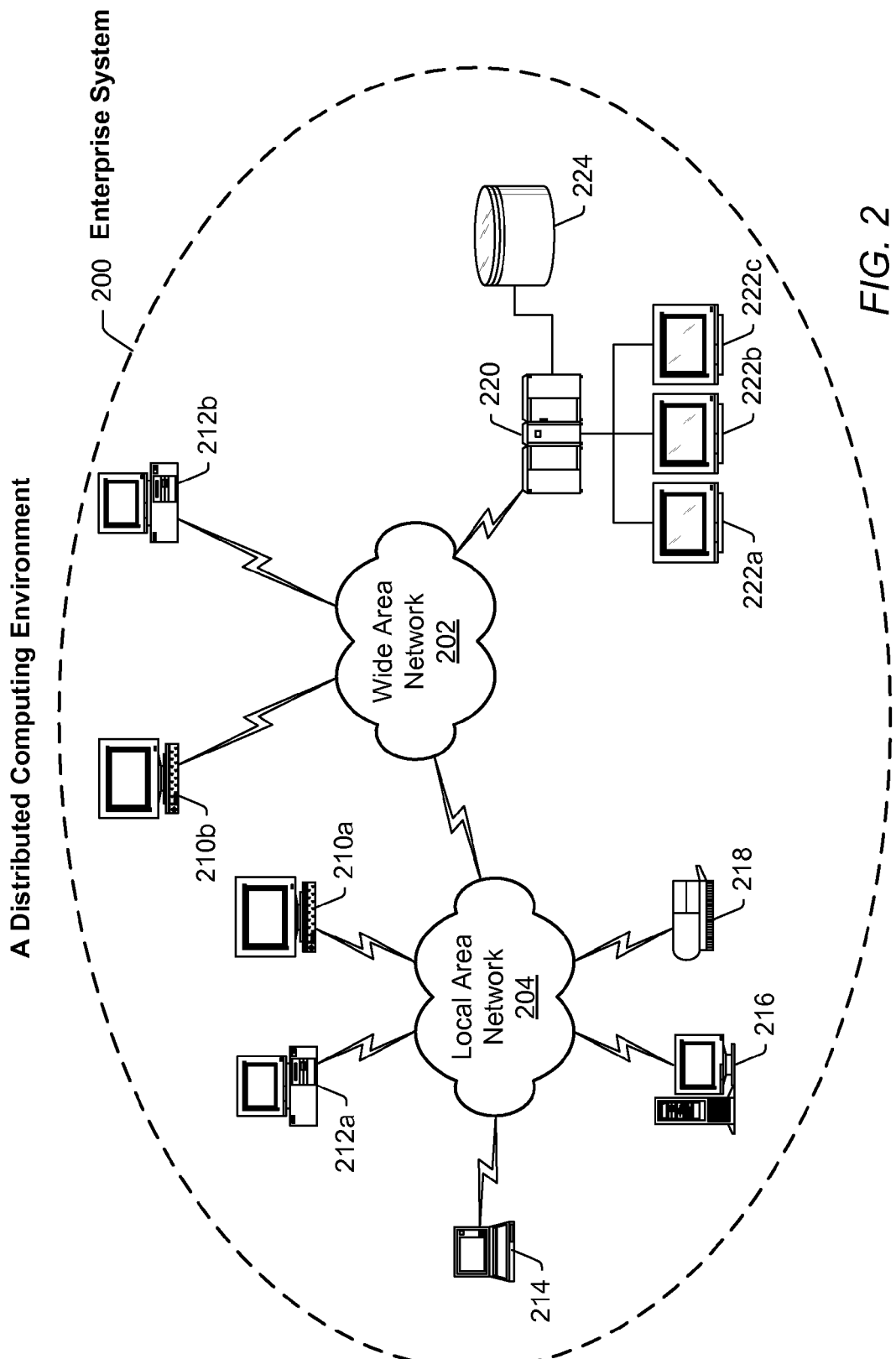
FIG. 2 illustrates a distributed computing environment according to one embodiment.

FIG. 2 illustrates a distributed or enterprise computing environment 200 according to one embodiment. An enterprise 200 may include a plurality of computer systems, such as computer system 101, which are interconnected through one or more networks. Although one particular embodiment is shown in FIG. 2, the enterprise 200 may comprise a variety of heterogeneous computer systems and networks which are interconnected in a variety of topologies and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 2 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 2 comprises one of each of these computer systems 210a, 212a, 214, and 216 and one printer 218. Each of the computer systems 210a, 212a, 214, and 216 may be an example of computer system 101, as illustrated in FIG. 1. The LAN 204 may be coupled to other computer systems and/or other devices and/or other LANs 204 through a WAN 202.

A mainframe computer system 220 may optionally be coupled to the enterprise 200. As shown in FIG. 2, the mainframe 220 is coupled to the enterprise 200 through the WAN 202, but alternatively the mainframe 220 may be coupled to the enterprise 200 through a LAN 204. The mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote. In one embodiment, the Internet may be included in WAN 202.

It is noted that one or more computer systems, as described in FIG. 1 or 2, may couple or connect to a measurement device or instrument that acquires measurement data from a device, WUT, or process. For example, measurement data may be generated by a measurement device (such as a data acquisition device), by an instrument or by an interface to a bus system hosting various devices or instruments. In this manner, the collected measurement data may be ultimately deposited in a data store and made available to any number of applications processing the measurement data in the enterprise system 200.

Technical Data Management Framework

Figure 3:
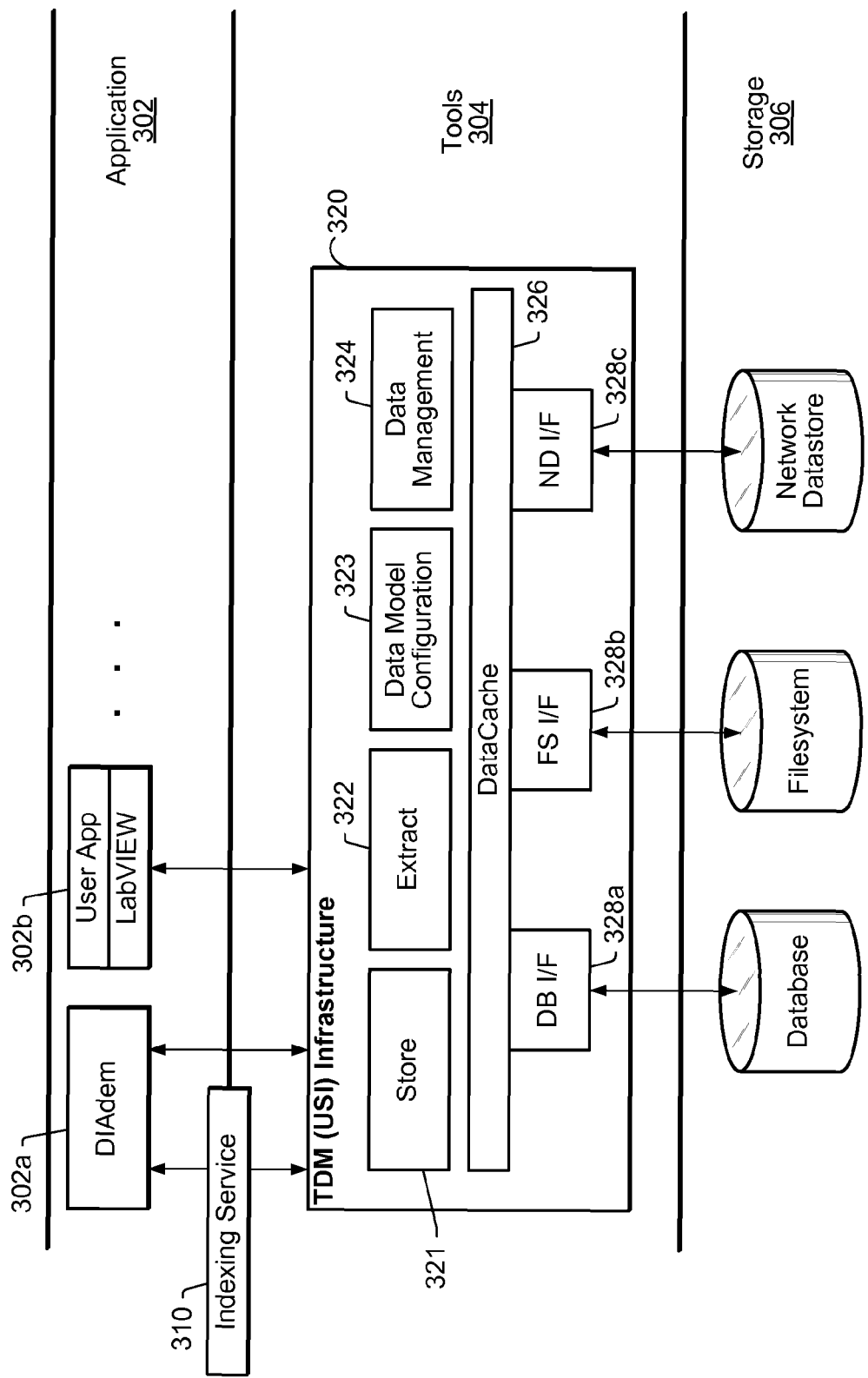
FIG. 3 illustrates a TDM framework according to one embodiment.

FIG. 3 illustrates a diagram for a 3-tier Technical Data Management (TDM) framework, in one embodiment. The TDM framework may include various components for managing the storage and retrieval of technical data (such as measurement data) in an enterprise system 200. The organization of the TDM framework in an enterprise system, shown in one embodiment in FIG. 3, is based on 3 tiers, or layers of functionality: application layer 302, tools layer 304, and storage layer 306. Each of these layers will be described in detail below. The enterprise system may collectively refer to a collection of applications 302, tools 304, and storage 306, including any required infrastructure and services, that are deployed across an enterprise or other organizational structure. In one embodiment, a TDM framework is operable on an enterprise distributed computing environment 200.

The application layer 302 includes the individual applications which may process measurement data in an enterprise system. The application layer 302 may include a plurality of individual application programs which process measurement data. As shown in FIG. 3, in one embodiment, TDM applications from National Instruments Corporation (DIAdem 302a, and LabVIEW 302b) may be used to acquire and store measurements, or retrieve measurements from a data store for analysis and visualization. In one example application, an organization performs tests on various devices, e.g., for quality control or R&D purposes, and the results of the tests may include measurement data. In other embodiments, applications in layer 302 may include commercially available software products from various vendors, or customized applications developed within an enterprise or industry.

In one embodiment, individual applications in layer 302 may access the same technical data for various purposes. For example, a first application may use data acquisition hardware to acquire waveform data from the devices, compute RMS and peak information from the data, and store the results. A second application may search for particular data sets that have been stored, perform further analysis on the data sets, and then re-store the data.

The tools layer 304 includes the TDM infrastructure for providing services and interfaces, that allow applications in application layer 302 to access resources in storage layer 306. It is noted that tools layer 304 may further include application-specific interface modules, such as indexing service 310, which, in one embodiment, provides access to measurement data by indexing meta-data, as will be described in detail below.

The functionality included in one embodiment of TDM infrastructure 320 may include modules operable to store 321 and extract 322 data from the storage level 306. It is noted that TDM infrastructure may also be referred to as a type of Universal Storage Interface (USI). The store 321 and extract 322 functions may further rely upon a data cache 326 for buffering data going into or coming from storage layer 306.

It is further noted that a data cache 326 may be implemented in various embodiments in different kinds of volatile or non-volatile memory, or any number of combinations thereof. The data cache 326 may provide performance enhancement by caching technical data in a variety of ways. In one embodiment, the data cache 326 stores the most recently accessed (stored or extracted) data, in order to reduce access times for subsequent operations involving the same data. In another embodiment, the data cache 326 may reduce or eliminate the number of accesses to a particular data file, by fetching meta-data and/or some portion of the data file, such that applications 302 are not required to access the data file itself for browsing or querying the file. In other embodiments, the data cache 326 may be coupled to indexing service 310 and store indexed information on measurement data files. Applications, such as the Diadem 302a and LabVIEW 302b applications shown in FIG. 3, may utilize any of the storage mechanisms supported by the TDM framework simply by utilizing the provided data cache 326 interface.

The interfaces provided by the TDM framework may allow for the storage and retrieval of data without regard to the storage mechanism (i.e., the type of data store actually accessed in storage layer 306). In other words, the TDM framework may hide differences in the various types of data stores, along with the complexity of the different access mechanisms, from the user/application accessing the data. The same access methods may be used no matter what data store actually stores the data. It is noted that this property of the TDM framework effectively encapsulates the management of various data stores within the TDM framework, and thereby centralizes TDM within the enterprise system 200. Note that the concept of centralization in the presently described methods is virtual and logical, referring to unified services and management responsibilities; the actual physical location of the data stores, applications, and TDM infrastructure may be distributed across the enterprise, or even be at a remote location.

The TDM infrastructure 320 may further include storage-specific plug-ins, which interface to a given type of storage via the data cache 326. In one embodiment, separate plug-ins for databases 328a, files 328b, and network data 328c may be included in the tools layer 304. In another embodiment, a separate plug-in 328 is installed for each type of individual data store, for example, a given data file format. A method for selecting a plug-in for indexing a particular type of data store, in one embodiment, is discussed in detail below (see FIG. 7). In one embodiment, a plug-in 328 may interface with an indexing service 310 for transferring meta-data and measurement data from a measurement data file (see FIG. 18). The types of data stores supported by the TDM framework can be expanded as necessary by adding new plug-ins, corresponding to new types of data stores.

Figure 18:
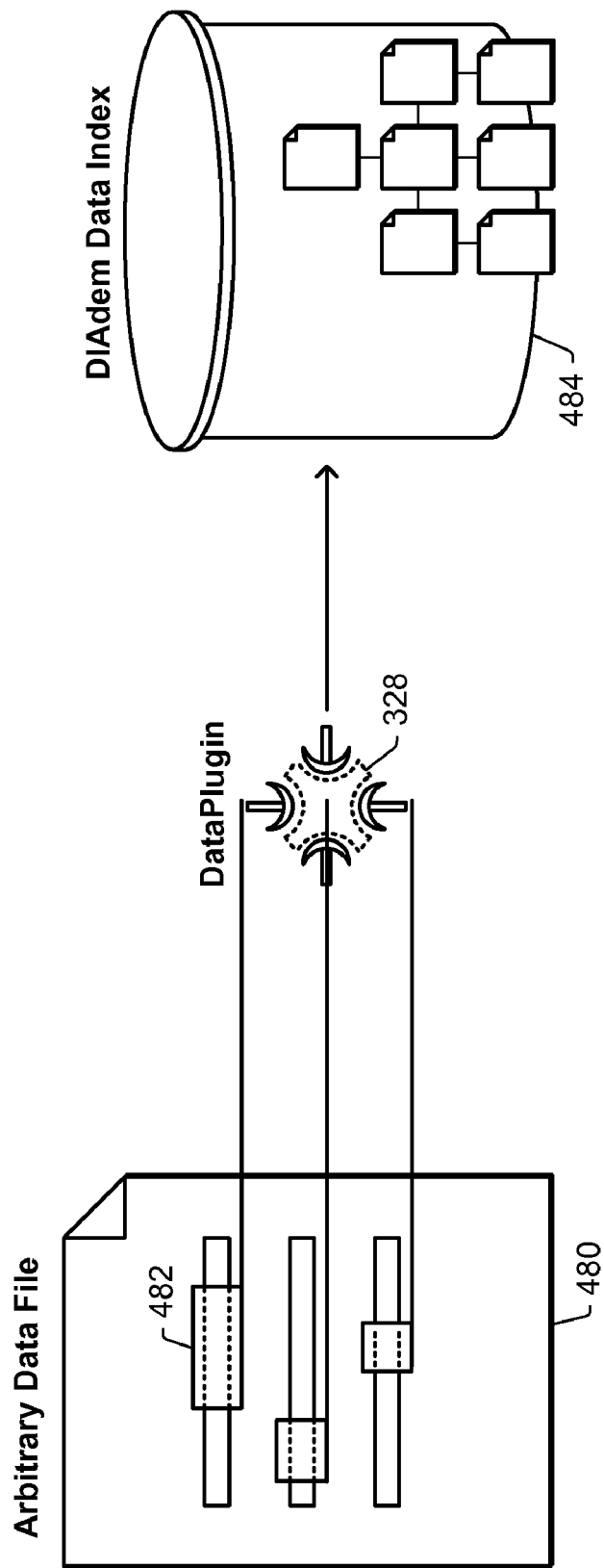
FIG. 18 illustrates a function of a data plug-in in one embodiment.

Referring now to FIG. 18, the relationship and function of a plug-in 328 is illustrated. A measurement data file 480 is stored including meta-data 482 that describe the measurement data. A plug-in 328 extracts data and meta-data 482 from the data file 480. In one example implementation, a plug-in 328 extracts meta-data 482 and stores these in an index 484, which may be used to browse or query the data file 480, without having to open and read the data file. The indexing operation may be performed upon introduction of the data file 480 or upon installation of the plug-in 328, or may be repeated at a later time, for example, at a regular interval, or in response to an indication of an update to the data file. One example of an indexing operation is described below with respect to FIG. 6. In one example, the plug-in 328 may read in the attributes from any previously stored arbitrary, binary, or ASCII file into the data index for searching custom file formats and legacy data.

Referring again to FIG. 3, additional functions in the tools layer 304 may include data model configuration 323 and data management functions 324. In one embodiment, these functions are included in the basic TDM infrastructure 320 and rely upon the data cache and plug-in architecture for accessing data. In other embodiments, these functions may represent administrative tools that are performed as required, for example, according to enterprise policy. It is noted that the implementation of the TDM framework, as shown in FIG. 3, may be accompanied by a user and administrator policy within the enterprise, which conveys the authorization to the TDM framework for providing access and management of data stores 306. The implementation of the policy may include providing (or restricting) access, depending on the individual data store and administered user rights. In one embodiment, the data management functions 324 may also include enforcement of digital rights policies associated with a particular data store.

Security may be enforced throughout the TDM framework to limit access to the technical data. In one embodiment, the security model may be compatible with the security defined in the ASAM-ODS specification and may be similar in design. The security model may also be compatible with security concepts utilized by various applications that utilize technical data, e.g., LabVIEW DSC, Lookout, etc.

In one embodiment, the security model may be built around users, user groups, and an access control list (ACL). Individual users may be defined and given a unique password. Users may be assigned to one or more user groups. User groups may be defined as is appropriate in individual applications, projects or organizations. The ACL assigns access rights for individual user groups to specific data objects (data items) in the data store. For a user group/data object pair, specific access rights may be defined in one entry of the ACL.

In some embodiments, specific data models and/or data stores may choose not to implement security, so that their data is accessible to all users. For example, data stores based on files may typically not implement security. However, formats such as ATF may be able to store the security information in a data model.

According to one exemplary embodiment, access rights can be granted at three different levels in the data model, as follows:

1. Application Element—An application element in the data model is assigned an access right in the ACL. All instances of this application element have the same access rights and need no individual entries in the ACL. This is appropriate for many small and medium size applications where defined groups of users have access to all instance of a particular type.

2. Instance Element—Individual instance elements are given access rights in the ACL. This is appropriate for large data storage system where data from different groups or projects are sorted in the same data model, and access rights need to be differentiated between different groups at the instance level.

3. Application Attribute—Access can also be given at the application attribute level, such that groups will have access to specific attributes on all instances of an application model. Such specific groups can access the attributes appropriate to them.

Alternatively, if none of these three access rights is defined, then if the instance has a parent instance with access rights defined, they may be copied to the child.

According to one embodiment, the ACL may assign five different access rights to a user group for a specific data object. These are: Read, Update, Insert, Delete and Grant. Some of these access rights do not apply to some of the access right level listed above and may be ignored by a data store.

Read—The user group is able to read the data object.

Update—The user group is able to update/edit the data object.

Insert—The user group is able to insert/add a new data object of the given type.

Delete—The user group is able to delete the specified data object.

Grant—The user group is able to grant/pass on its own rights for a specific data object to another user group.

Most of the functionality required for security is part of a data store implementation to limit access to data and manage the information in the ACL. The different interfaces and components between an application and the data store may pass security information from the application to the data store, such as the user name and password, and may pass information about access rights for new data objects to the data store so that they can be stored in the ACL. Additionally, security management information may be passed from a separate tool to the data source. Security management may be performed locally to the data source, or remote security management may be possible, e.g., may be handled through the data cache 326 or by a data cache server.

Although the security information is normally stored in the application data model, user and user group management may be performed in various embodiments using a separate tool or component to edit this information. Additionally this tool may be used to directly manipulate the ACL when incorrect information is present. In some embodiments, security information may not be accessible through the regular data storage functions. Management of user information may be limited to one user group, which is designated as a "Superuser" group (i.e., system administrators). In one implementation, this group can never be empty and only members of this group can add new members to this group.

In one embodiment, data management functions 324 may include various functions related to the management of multiple data stores. For example, the data management functions 324 may allow a user or client application to delete entries from a data store or move or copy data store entries. The TDM framework may also support mapping or copying data entries from one data store to another data store. In one embodiment, when different data stores use different data models, a client application may be responsible for mapping the data from one model to another. In another embodiment, automatic conversion between the data models may be supported. The user may need to supply information specifying how the conversion is to be performed. For example, the user may utilize a tool to specify mapping points in the two data models, provided by TDM infrastructure 320.

In one embodiment, the TDM framework may also support automatic synchronization/replication between multiple copies of the same data store. For example, when a change to one of the copies is made, the other copies may be automatically updated to reflect the change. The synchronization/replication process may be bi-directional. Each data store may reflect the complete and most up to date status after the synchronization/replication. Updates may be performed with each change or at regular intervals.

A unidirectional process to import new data from a remote data store to a network master data store may also be supported in certain embodiments. This may be useful in a portable application where data is acquired on a disconnected computer to a local data store, and then imported to the network master data store when the computer is reconnected to the network. The disconnected computer may or may not receive data from the master data store which came from other client systems, or may receive such data on demand.

The TDM framework may utilize data models to support the concept of self-describing measurement data. A data model may define a structure of data items, their attributes, and relationships between different data items. In one embodiment, the data model configuration 323 and data management 324 functions may be used to configure and manage information relating to a data model, such as meta-data.

Information describing the data model is called meta-data. The meta-data in the data model give meaning to the actual stored data by specifying what the data represents. It is often useful to explicitly state and store the data model used by a particular application, especially in larger applications or where the data is used by multiple applications. An application or user unfamiliar with the data can apply the meta-data to properly interpret the data.

In one embodiment, the TDM framework may enable users to define and use their own data models using meta-data. Defining a data model by storing meta-data with the measurement data may impart a self-describing quality to a particular data store. For example, if channel or trace data can be recognized as an entity that includes bulk waveform data, applications that use the channel or trace data can offer adapted methods to deal with this waveform data, e.g., to display it in a diagram. The meta-data may also make it easier to keep measurement data consistent, by providing examples and historical records of previously acquired measurement data. In one example, the meta-data in an existing data store may be reused as a template, or may be adapted for storing a similar or related measurement.

The term data model architecture refers to the structure of a valid data model, whereas meta-data represent the implementation on a particular data model. The data model architecture may define the pieces of a data model, and how the different pieces can be linked or joined into a data model. Note that knowledge of the data model architecture is not required for accessing (e.g., indexing, browsing, querying) measurement data using the methods described herein; the TDM framework, including meta-data, provides the necessary information for accessing measurement data. In one embodiment, instructions relating to the interpretation of a particular data model architecture are implemented in a plug-in, which directly accesses a measurement data file to retrieve meta-data and measurement data stored according to that data model.

In various embodiments, the data models utilized by the TDM framework may be implemented according to any of various data model architectures. According to one embodiment, the meta-data includes two parts, the base model and the application model, which is derived form the base model. The base model describes the basic elements of a data source or data store. It may also include elements to describe measurement data, administrative information, units, dimensions, and provisions for any application-specific data. The application model is derived from the base model and describes the specific elements of the data model for a particular application. The base model serves as a general guideline for how application models in a group of applications should be setup. However, the application model defines the data model for each individual application.

Figure 4A:
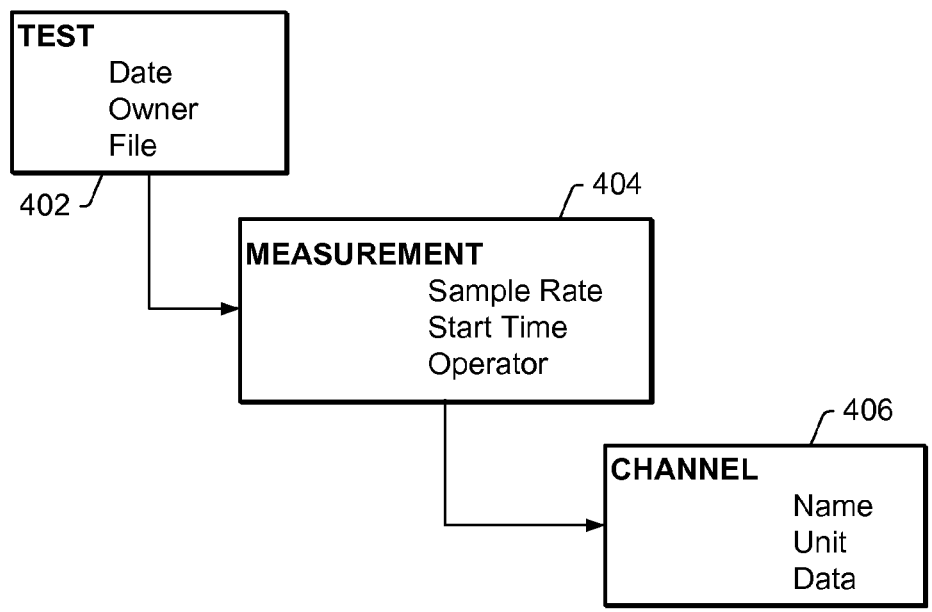
FIGS. 4A and 4B illustrate a hierarchical data model in one embodiment.
Figure 4B:
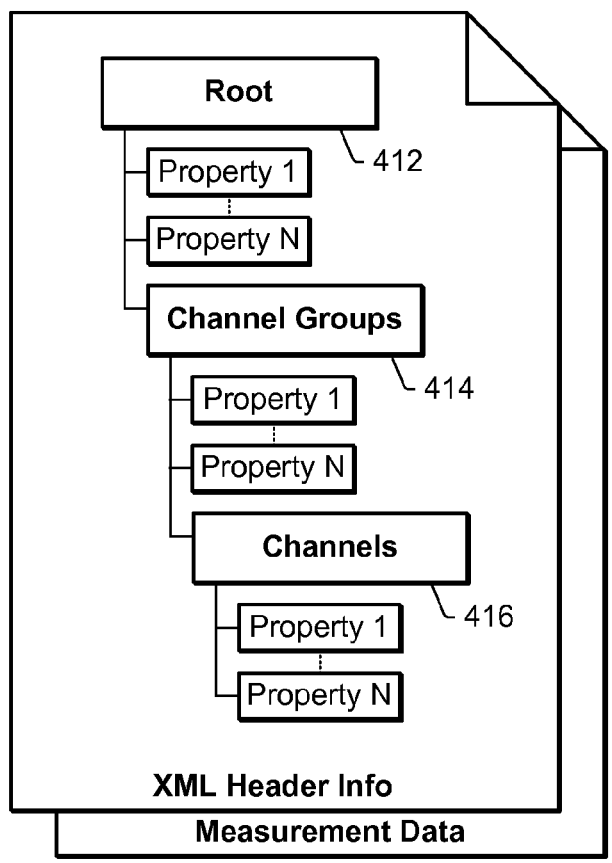

In other embodiments involving measurement data, the data model may represent a hierarchical data model, for example, a TDM data model. In one embodiment presented in detail below, a TDM data model comprises a 3-level hierarchy of meta-data, including: a file/root level; a group/type/setup level; and a signal/channel/trace level. Each of these levels in the hierarchical data model may be associated with its own kind of meta-data for describing that level, as described with the following examples, which correspond to the illustration in FIGS. 4A and 4B. FIG. 4A shows a specific example of a more general hierarchical TDM data model illustrated in one embodiment in FIG. 4B. In one exemplary embodiment, a TDM data model involves splitting the measurement information (i.e., measurement data) and attribute information (i.e., meta-data) into separate files, one that contains all the measurement data in a binary form and an XML header to manage the structure and attributes. This combination of binary and XML may provide significant advantages for fast, portable, flexible, and search ready TDM data files. In various other embodiments (not shown), a hierarchical model of data using different numbers of levels and organizations may be used with the methods described herein.

In some embodiments, the highest level 412 in the hierarchical model is the file/root level, which may include meta-data for one or more of the following aspects related to the storage of a measurement data file:
- timestamp information for the measurement data
- owner of the measurement data
- name of the file/root
- type of the file/root
- format of the file/root
- path/location of the file/root.

One example of the file/root level is shown by the TEST field 402, which includes the data, owner and file information.

In some embodiments, the middle level 414 in hierarchical model is the group/type/setup level, which may include meta-data for one or more of the following aspects related to the organization of the data in a measurement data file:
- type of measurement of the group/type/setup
- description of the type of measurement
- operator of the group/type/setup
- recommended type of analysis/post-processing for the group/type/setup
- reference to another document describing the measurement setup/channel list in the group/type/setup
- measurement setup/channel list in the group/type/setup
- sample rate for group/type/setup.

One example of the group/type/setup level is shown by the MEASUREMENT field 404, which includes the sample rate, start time and operator of the measurements in a setup.

In some embodiments, the lowest level 416 in hierarchical model is the signal/channel/trace level, which may include meta-data for one or more of the following aspects related to an individual channel or signal of data in a measurement data file:
- name of the signal/channel/trace
- engineering unit for the signal/channel/trace
- description of the engineering unit
- description of the signal/channel/trace
- unique ID for the signal/channel/trace
- unique ID for the sensor/transducer measuring the signal/channel/trace
- an image of the signal/channel/trace
- a set of data points included in the signal/channel/trace.

One example of the signal/channel/trace level is shown by the CHANNEL field 406, which includes the name, unit and data for one or more channels of measurement data.

The TDM framework may also include various utilities to search, view, or analyze technical data (not shown in FIG. 3). These utilities may utilize the underlying interfaces provided by the TDM framework. The TDM framework may also provide a set of user interface components.

In various embodiments, the TDM framework may allow applications to register to be notified when changes occur to a particular data item. When two or more applications access the same data, the TDM framework may control write access from these applications on the data. In some embodiments, simultaneous write access by multiple applications may be allowed. In these implementations, the TDM framework manages the access and maintains a consistent state in its cached data and the data store.

As will be described in further detail below, the TDM framework and the methods described herein may simplify technical data management tasks by providing a common data retrieval and storage interface for applications to use for managing diverse collections of technical data. It is further noted that embodiments of the methods described herein do not require introducing non-standard, customized code in the enterprise 200, for enabling interoperability among different applications. Instead, a plug-in architecture and a centralized indexing service provide the ability to accommodate various types of stored data at different locations from a unified TDM framework.

Figure 5:
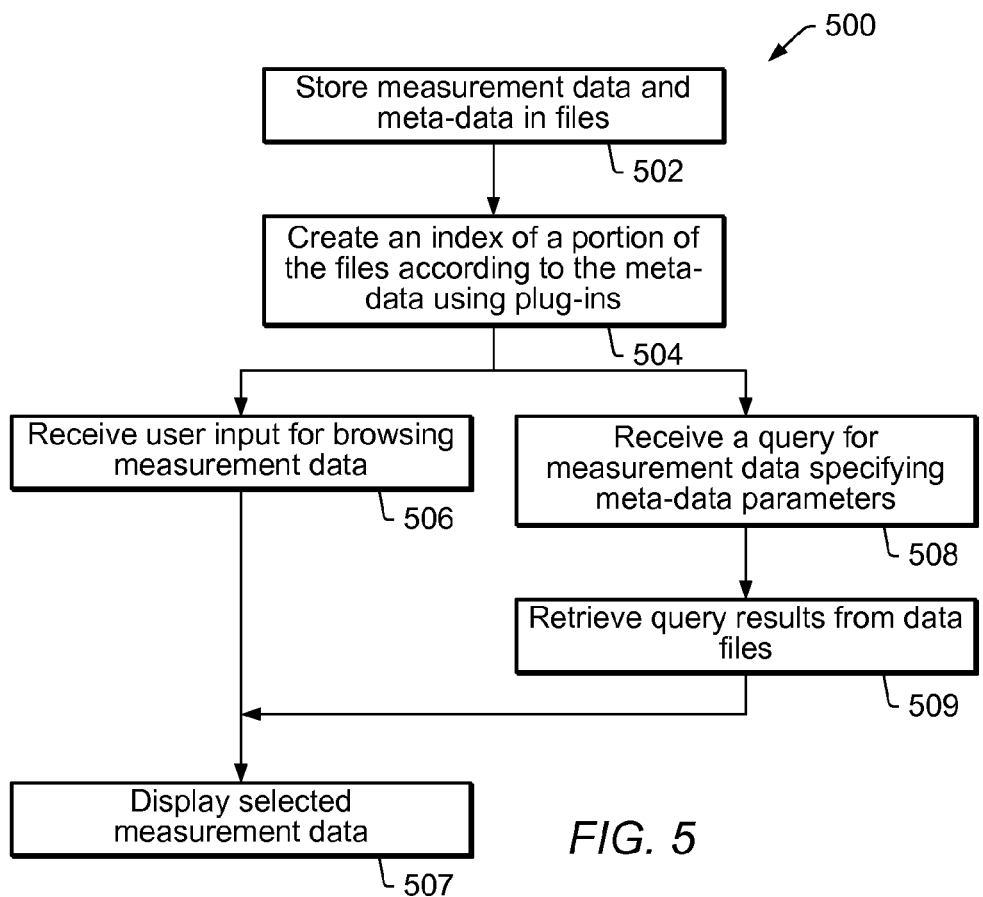
FIG. 5 is a flowchart diagram illustrating one embodiment of a method for accessing measurement data.

Referring to FIG. 5, a method 500 for processing measurement data is illustrated in one embodiment. It is noted that in various embodiments, the method 500 may be performed by the TDM infrastructure 320 on a computer system 101 for accessing measurement data within the enterprise system 200.

In step 502, measurement data may be stored in an enterprise system 200 in one or more data files. Along with the measurement data, meta-data associated with the measurement data may also be stored in step 502. The meta-data describe characteristics of the measurement data. In some embodiments, the meta-data describe all aspects of the measurement data required for accessing the measurement data. For example, a plurality of data files are stored in step 502. The data files may be generated in one embodiment by an application program 302 which stores the measurement data at a location within the enterprise system 200.

The one or more data files stored in step 502 may be designated with a file type designation which corresponds to the data format of the file. For example, a file type of .txt corresponds to a text file. The data format and/or the contents of the file may represent a specific file type. The file type may be associated with a given application program, for example: the file type ".xls", which is generally associated with Microsoft Excel. It is noted that a given file type may be associated with one or more applications, and more than one application may be able to process any given file type, as will be described in more detail below.

In one embodiment, the data files may be stored in step 502 using the store function 321 of a TDM framework, for example, by using a standard user interface for defining the measurement data, meta-data and location of the data file. In one instance, the standard user interface is provided by TDM infrastructure 326, for example, by the store 321 and/or data management 324 functions. The location of the data files may be determined by the user or determined by enterprise policies, which may depend upon file type, user access, application program requirements, workflow requirements, or other factors.

In step 504, an index of a portion of the files may be created according to the meta-data associated with each portion of measurement data, according to some embodiments. In one embodiment, step 504 is performed by indexing service 310 using plug-ins, as will be described in detail below, which are respectively associated with each of the files. In various embodiments, upon completion of step 504, at least some portion of measurement data in one or more files is indexed and ready for access by applications within the enterprise via the TDM infrastructure 320.

Continuing with the method shown in FIG. 5, two separate options are illustrated for processing measurement data indexed in step 504: browsing and querying. Although these method steps are shown as parallel steps in FIG. 5, in various other embodiments, browsing and querying may be intermingled and performed interactively, as desired.

In step 506, user input for browsing at least one first data file is received, according to some embodiments. The TDM infrastructure 326 may further include a user interface for displaying a hierarchical view which contains at least a subset of the plurality of indexed data files, as described above. In one embodiment, the user input comprises user input to the hierarchical view of data files in the enterprise system 200. The user input may include expanding and collapsing elements of the hierarchical view, representing a hierarchical data store, wherein each level is a directory or folder in a file system, which may contain further directories and/or data files. In some embodiments, the hierarchical view corresponds to a hierarchical data model, wherein meta-data describe the various levels in the hierarchy, as mentioned previously.

In various embodiments, in step 508 a query for measurement data, including parameters of meta-data associated with the measurement data may be received. In one embodiment, the query is a structured statement, for example, similar to an SQL Select statement. The query may be issued by a user interactively, or by another application or service, which is requesting automated access to a selected portion of measurement data. In step 509, the results of the query may be retrieved from one or more data files. In various embodiments of step 509 (see also FIG. 9), a plug-in associated with each data file from which query results are retrieved may be used to retrieve measurement data from the data file.

In step 507 of FIG. 5, measurement data selected by browsing (step 506) or by querying (steps 508, 509) may be displayed. In one embodiment, measurement data may be retrieved from the data file during step 507, for displaying, either in a table or a graphic, the selected measurement data. In other embodiments, the indexing service 310 has stored a portion of the measurement data along with (or included within) the meta-data stored in the index. For example, in various embodiments, a finite number of measurement points in a measurement data file containing signal trace information are automatically retrieved during indexing, and used to display selected measurement data for that file. In certain instances, a given number of data points, for example 1,000 data points, are retrieved from the beginning of each channel measurement for indexing. In other cases, the representation of a signal trace for a channel over a collection period are reduced to a fixed number of data points, for example 1,000 data points, for inclusion in the index. Other amounts of data and indexing schemes may be alternatively used in various embodiments, including storing meta-data and measurement points in data cache 326.

Figure 6:
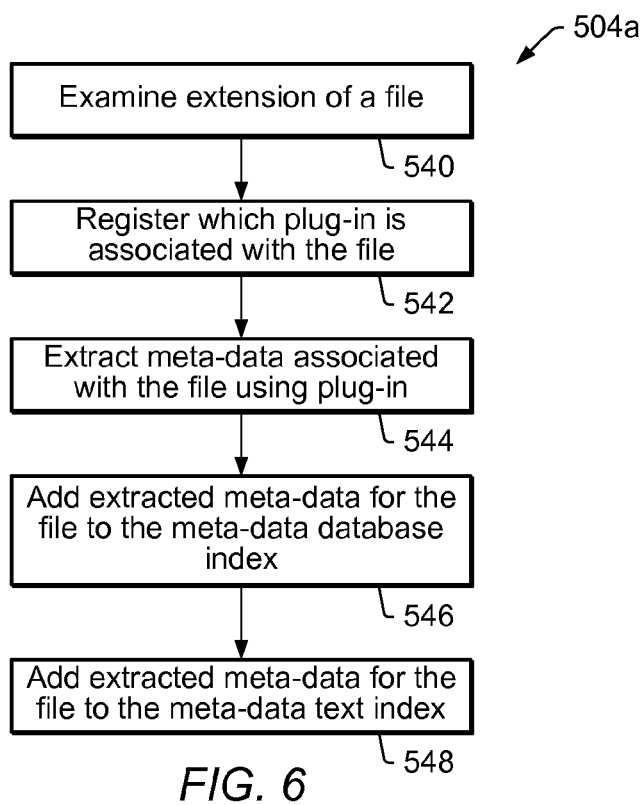
FIG. 6 is a flowchart diagram illustrating one embodiment of a method for extracting meta-data into an index.

Referring now to FIG. 6, an embodiment of step 504 is described in further detail in method 504a, which illustrates an exemplary method for indexing a measurement data file using the indexing service 310. In step 540, the extension of the measurement data file is examined. Based on the file extension, the method may register which plug-in is associated with the file (step 542; see also FIGS. 7 and 10). The registered plug-in may then be used to extract meta-data from the measurement data file (step 544). In one embodiment, the extracted meta-data may be added to a database index (step 546) and a text index (step 548). The database index of meta-data provides the ability to query indexed measurement data according to parameters of meta-data associated with the measurement data. The text index of meta-data provides the ability to search measurement data based on any textual information in the meta-data.

Figure 7:
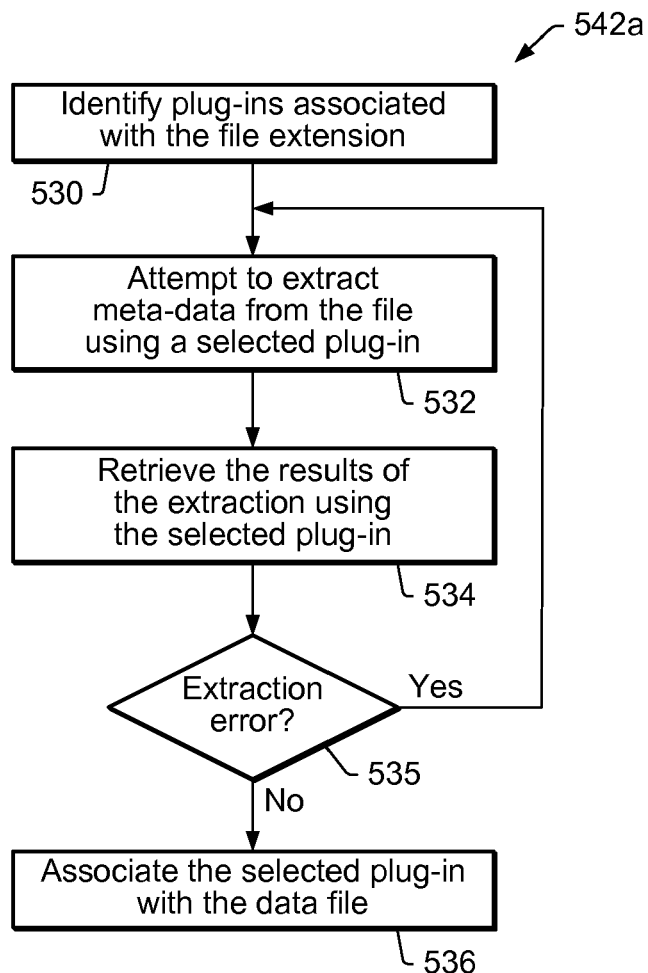
FIG. 7 is a flowchart diagram illustrating one embodiment of a method for selecting a plug-in for a data file.

Referring now to FIG. 7, an embodiment of step 542 is described in further detail in method 542a, which illustrates an exemplary method for selecting and registering a plug-in for a data file. In one exemplary implementation, method 542a is performed by indexing service 310 each time a new data file is introduced to storage layer 306. Since the file extension for the given data file has been examined in step 540, the first step in method 542a involves identifying one or more plug-ins that are associated with the file extension (step 530). Using a selected plug-in, an attempt is made to extract meta-data from the data file (step 532). The results of the attempted extraction are retrieved using the selected plug-in (step 534). A determination is made, whether or not an error has occurred during extraction (step 535). If no error has been made, then the selected plug-in may be assumed suitable for accessing the data file (i.e., the plug-in contains the correct hierarchical data model architecture for extracting meta-data from the file). In that case, where the determination of error in step 535 is negative, the selected plug-in may be associated with the data file (step 536).

In various embodiments, the association may further involve registering the plug-in and/or data file as being associated. If the determination of error in step 535 is positive, then the method may loop back to step 532, and select another plug-in for an attempted extraction. Using this iterative manner in some embodiments, the correct plug-in for the data file may be selected. It is noted that the method 542a may also be used in other embodiments to identify or verify a certain type of data file, if the selected plug-in is known to correspond to that type of data file. It is also noted that the method steps for selecting and indexing a data file involve reading the contents of the data file, whereas subsequent browsing and querying operations may not require accessing the data file.

In other embodiments, the method described herein for selecting a plug-in may also result in more than one plug-in being associated with a given data file, wherein each associated plug-in was successfully able to read the meta-data in the data file. The actual choice of an active plug-in may be made subsequent to selecting each of the more than one plug-in, for example, in response to subsequent user input.

Figure 10:
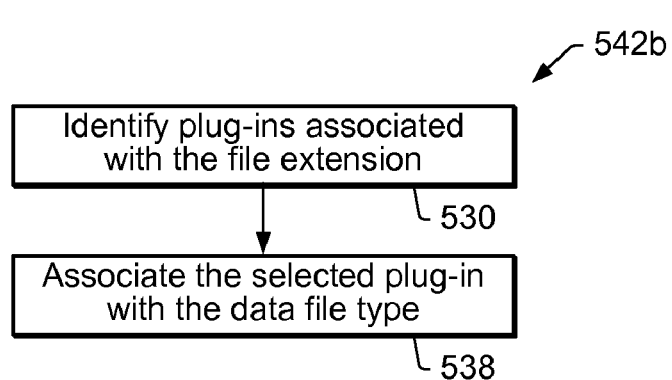
FIG. 10 is a flowchart diagram illustrating one embodiment of a method for selecting a plug-in for a data file.

Referring now to FIG. 10, an alternative embodiment of step 542 is described by method 542b. It is noted that corresponding functions from FIG. 7 are numbered identically. In step 538, the selected plug-in is associated with the data file type, as determined by the file extension in step 530.

Figure 8:
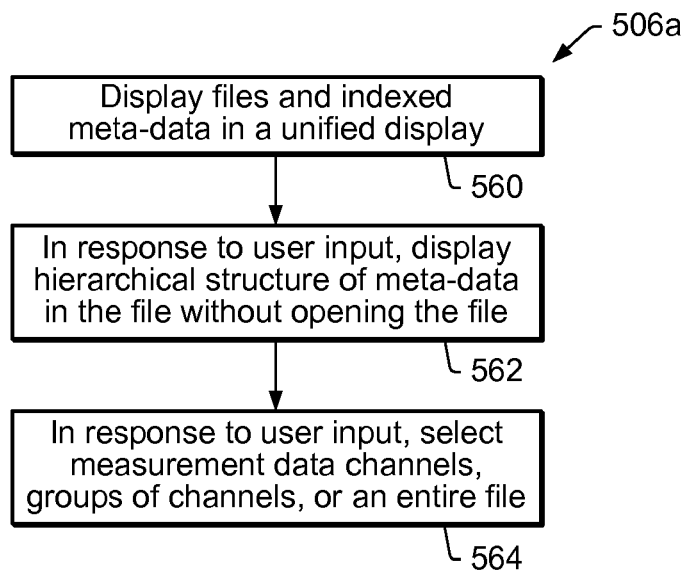
FIG. 8 is a flowchart diagram illustrating one embodiment of a method for browsing data files.

The browsing function in step 506 may also include displaying non-measurement data files (i.e., ordinary files in a data store) and optionally meta-data associated with the non-measurement data. Referring now to FIG. 8, a method 506a in one embodiment of step 506 is illustrated in further detail. In method 506a, the browsing function may display ordinary files and indexed meta-data for measurement data files in a unified display (step 560). In one example, the display may take the form of an collapsable tree structure, commonly referred to as an explorer (see description below regarding FIG. 11). It is noted that the distinction between data files, and indexed meta-data, which describe the contents of a measurement data file, may be made transparent to the user during browsing in step 506. In other words, the browsing function in step 506 may provide access to ordinary files and indexed measurement data files, including access to individual meta-data, in a single unified user interface, within the same hierarchical view.

In response to user input, the hierarchical structure of the meta-data in the file may be displayed. In one embodiment, an indexed version of the meta-data is used for browsing, such that displaying the hierarchical structure of the meta-data in the file does not require opening the file (step 562). Further in response to user input, method 506*a* may provide selection of measurement data channels, groups of channels, or entire files (step 564).

Figure 11:
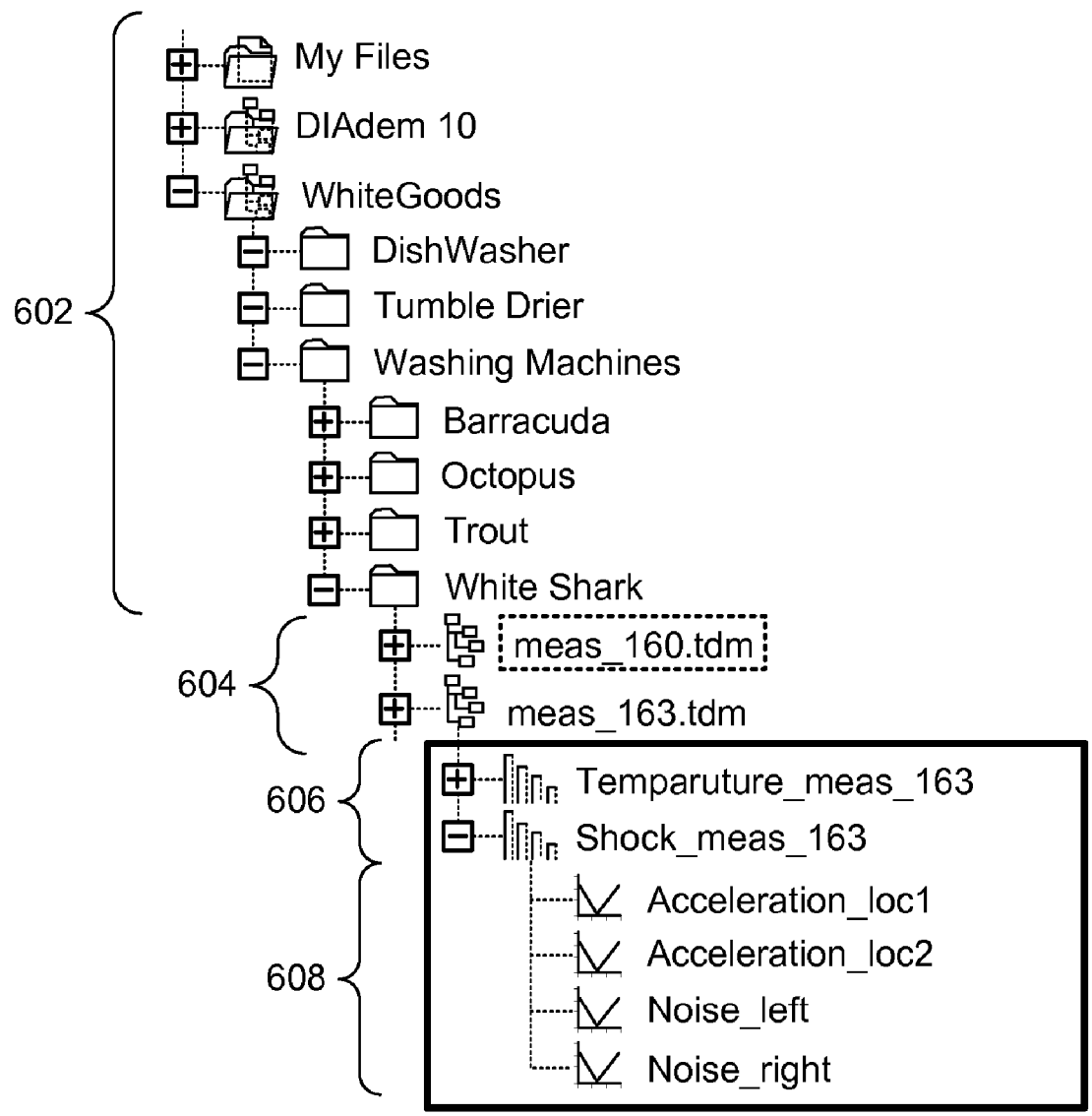
FIG. 11 illustrates a unified hierarchical display of data folders and data files according to one embodiment.

Referring now to FIG. 11, a portion of a user interface showing a unified hierarchical view of data folders, data files and measurement data (represented by meta-data) is illustrated in one embodiment. A hierarchical collection of data folders 602 (i.e., directories, registers etc.) may represent the location and ordering of data in a data store. Each data folder may contain other data folders or data files 604. The data files 604 may be non-measurement or measurement data files. In the case of measurement data files 604 that have been previously indexed, the contents of any data file may also be displayed for browsing. For example, a data file may contain one or more measurements 606, which may be revealed upon expanding a data file 604. Any one of the measurements 606 may further be expanded to reveal one or more individual data channels 608. Note that the measurements 606 and channels 608 may be displayed with their actual meta-data descriptive values. It is also noted that in one embodiment, the browsing into a measurement data file does not require that the data file itself be opened, but rather, meta-data are retrieved from an index to enable browsing. It is further noted that in various embodiments, the hierarchical view shown in FIG. 11 may correspond to the TDM hierarchical data model illustrated in FIG. 4B, as described above. In particular, data files 604 may correspond to the file/root level 412; measurements 606 may correspond to the group/type/setup level 414; and channels 608 may correspond to the signal/channel/trace level 416.

A unified hierarchical display according to the presently described features as shown in FIG. 11 may appear to a user browsing the display to operate as if measurements 606 and channels 608 were available as data folders or data files in any other part of the hierarchy. In particular, measurement data files 604 and measurements 606 may appear to have attributes of data folders, being further expandable to reveal their respective contents within the explorer or other browsing user interface. In one embodiment, the browsing interface may be a text-based command prompt, requiring explicit commands for listing or navigating the hierarchy.

Figure 9:
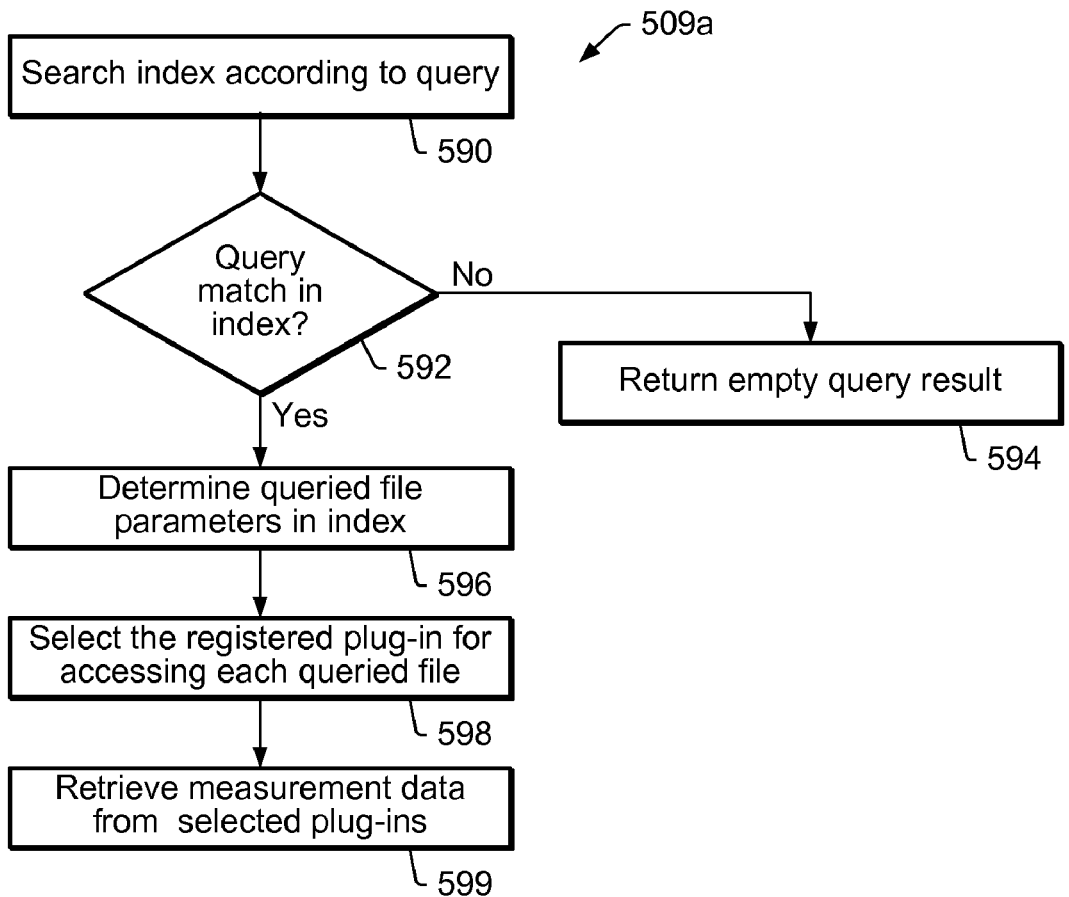
FIG. 9 is a flowchart diagram illustrating one embodiment of a method for querying a data file.

Referring now to FIG. 9, an embodiment of step 509 is described in further detail in method 509*a*, which illustrates an exemplary method for retrieving query results. In one exemplary implementation, method 509*a* may be performed by indexing service 310 each time a query is issued for retrieving measurement data. In step 590, the index is searched according to the query, such that either the database index or the text index or both are searched. In step 592 a determination is made if there is a match in the index that corresponds to the parameters of the query. In other words, it is determined if the search 590 found indexed meta-data corresponding to the parameters of meta-data in the query. If the determination in step 592 is negative, then in step 594 an empty result is returned, and method 509*a* may end. If the determination in step 592 is positive, then the file parameters for each queried file (i.e., each file whose meta-data matched the query) are determined in step 596. In one example, the file parameters may include the file extension, file type, and location of the file (i.e., the file path). In step 598, the registered plug-in for accessing each queried file is selected. Then, in step 599, measurement data corresponding to the query are retrieved using the selected plug-ins.

Exemplary Use Cases

The following brief descriptions describe exemplary usage scenarios, in different embodiments, in which various applications may utilize the technical data management (TDM) framework to store/access technical data.

Example 1

A data acquisition application may utilize the TDM framework to store waveform or other bulk data. The waveform data may be streamed from the application to the TDM framework using a streaming interface. The TDM framework may store the waveform data in a database specialized for storing waveform/bulk data. In one embodiment, attribute data associated with the waveform data may be stored in a different database, e.g., a relational database.

Example 2

A graphical programming development environment may utilize the TDM framework to store and retrieve data associated with graphical programs. For example, the graphical programming development environment may store/retrieve front panel data using the TDM framework. The graphical programming development environment may also store/retrieve block diagram data using the TDM framework.

Example 3

A test executive software application may utilize the TDM framework to store execution results of test executive sequences, e.g., measurement data indicating results of executing various tests on a unit under test (UUT).

Example 4

A technical data analysis application may utilize the TDM framework to retrieve previously stored measurement data. Meta-data stored with the measurement data may be utilized by the analysis application to give a meaning to the measurement data. After processing the data, the analysis application may utilize the TDM framework to store the results of the analysis.

It is noted that these applications are exemplary only, and the TDM framework may be utilized by any of various other types of applications to manage technical data. Also, the TDM framework may serve as a common data storage/retrieval mechanism that integrates various applications. For example, the technical data analysis application in Example 4 may utilize the TDM framework to retrieve and analyze data previously stored by one of the other applications.

User Interface Components

In some embodiments, a user interface component may allow various applications to easily display a user interface showing the data model and/or contents of a data store. Various aspects of a browser component providing this functionality in some embodiments are described below. A user interface component may also be used to select items from a data store for loading or other processing. Additional user interface components may be available for performing other tasks, such as configuring security management, configuring networked data stores, etc.

The user interface components may be activated through a number of different interfaces in various different embodiments, for example, as separate ActiveX controls. The user interface components may also utilize a lower-level interface, such as a programming command interface.

Figure 12:
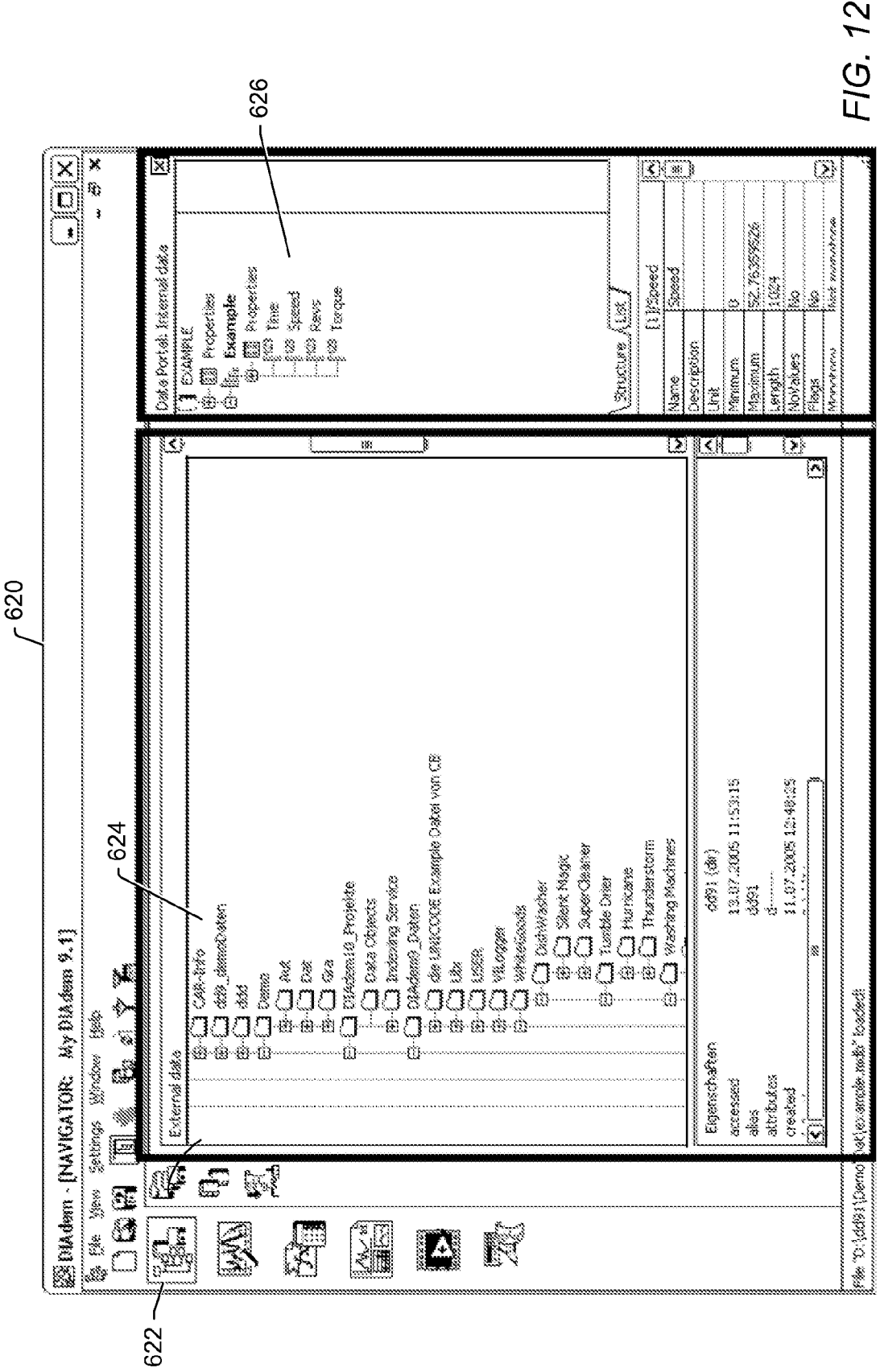
FIGS. 12 and 13 illustrate a dialog to perform a query to search a data store in one embodiment.

FIG. 12 illustrates an exemplary graphical user interface for a browser control. The user interface of the browser control is laid out as a navigator window 620. An explorer structure 624, with a tree view of a hierarchically organized data store and its contents may be displayed by selecting the browsing function 622 in the navigator (see also FIG. 11). The tree view displays the structure of the data store (data model) and lists the data items present in the data store. In one implementation, depending on the configuration of the browser, more or less detail about the data model maybe displayed. On the right side of the user interface is a detailed view 626 supplying more information about marked or selected objects in the tree view. For each data item, certain attribute values are displayed (i.e. meta-data values). The list of attributes to be displayed can be selected through a popup dialog window (not shown), and may refer to one or more data files. The relative size of the tree view and detailed view sections can be adjusted with a movable separation.

In addition, the browser may utilize the data model or meta-data associated with the data store contents so that the browser is able to properly interpret data of any type and properly display the data. For example, the browser may utilize the meta-data to determine a structure of the data and display the data according to the determined structure. The data may then be displayed so as to indicate the relationship among the plurality of elements. One embodiment of a hierarchical display that may be used in browsing function 622 is shown in FIG. 11, as described in detail above. It is noted that the hierarchical view may be displayed in response to user input specifying criteria limiting the displayed data. The user input may refer to one or more data files, or hierarchical elements from one or more data files, for example, a group in one file and a channel in another file. Numerous other combinations and examples may be practices in various embodiments.

The browser also includes a number of popup dialogs used to access and parameterize different functions of the browser such as filtering and searching. The browser can filter the display of data items in its user interface based on the attribute values (i.e., indexed meta-data) of the data items.

Figure 13:
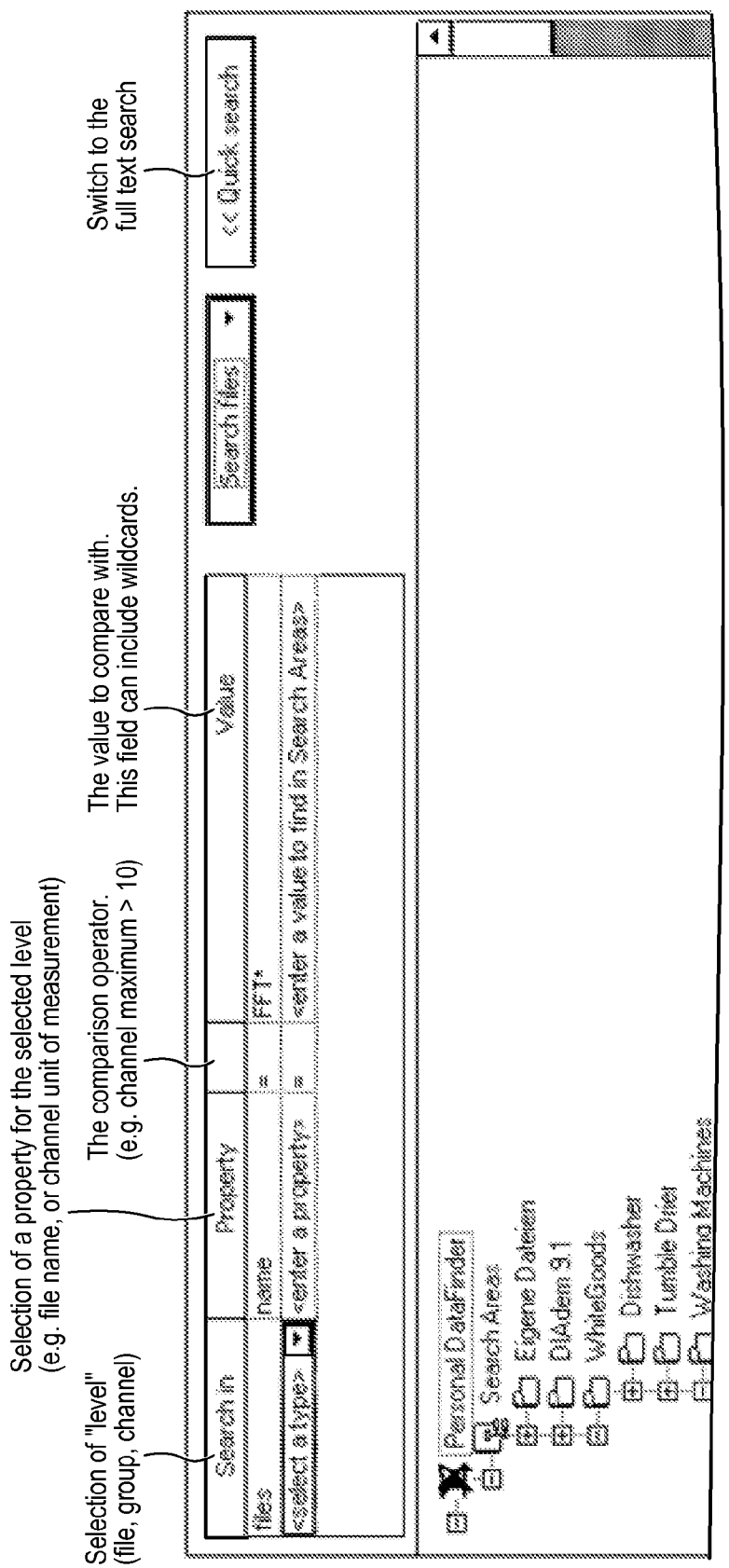
Figure 14:
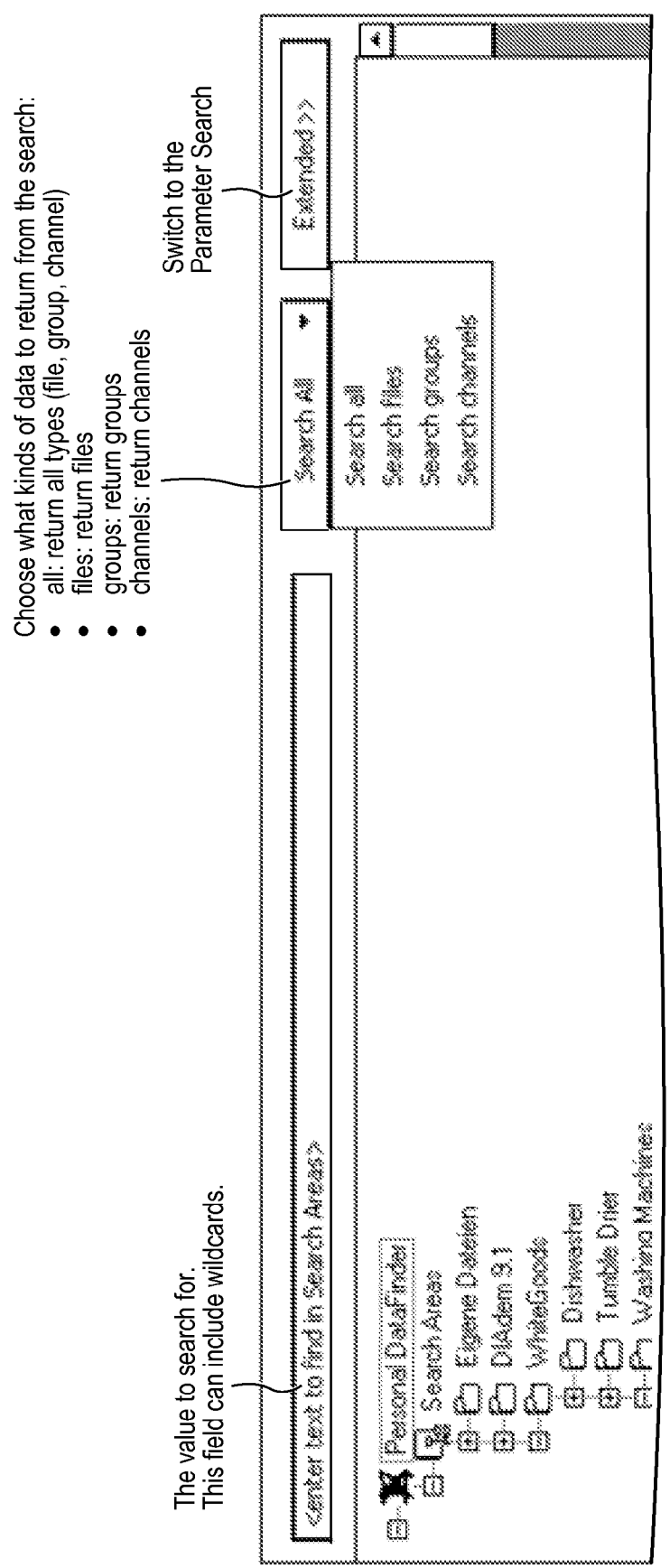
FIG. 14 illustrates a user interface used for configuring specific ranges to query selected values of attributes in one embodiment.

The browser may also include a search function to search the current data store for specific data items that fit certain criteria. In one embodiment, a separate dialog to perform the search may be displayed, as shown in FIGS. 13 and 14. Referring to FIG. 14, the user can specify the portion of the data store to search in, as well as the search criteria, e.g., the attribute values of the data items. As shown in FIG. 14, the search function may involve a text search, wherein the scope of the searched data may be specified according to the TDM hierarchical data model. In one embodiment, the search functions do not require the searched data files to be opened and do not require reading data from files; instead the search is performed on indexed meta-data, which provides the ability for rapid and precise searching throughout the enterprise system.

The found items may be displayed either in an additional section of the dialog or in a new section of the main browser window.

The browser control can be configured using a configuration file to determine the exact display of the data model and data items. This includes the browse path through the data model, as well as attributes to be displayed and any filter settings.

It is noted that a conditional query may also be issued through a user interface, as shown in FIGS. 13 and 14, or by a programmatic command interface, for selecting portions of data according to conditions or values of attributes. In one embodiment a query may also be processed and results of the query retrieved without requiring a queried data file to be opened, but rather by executing the query on indexed meta-data.

Figure 15:
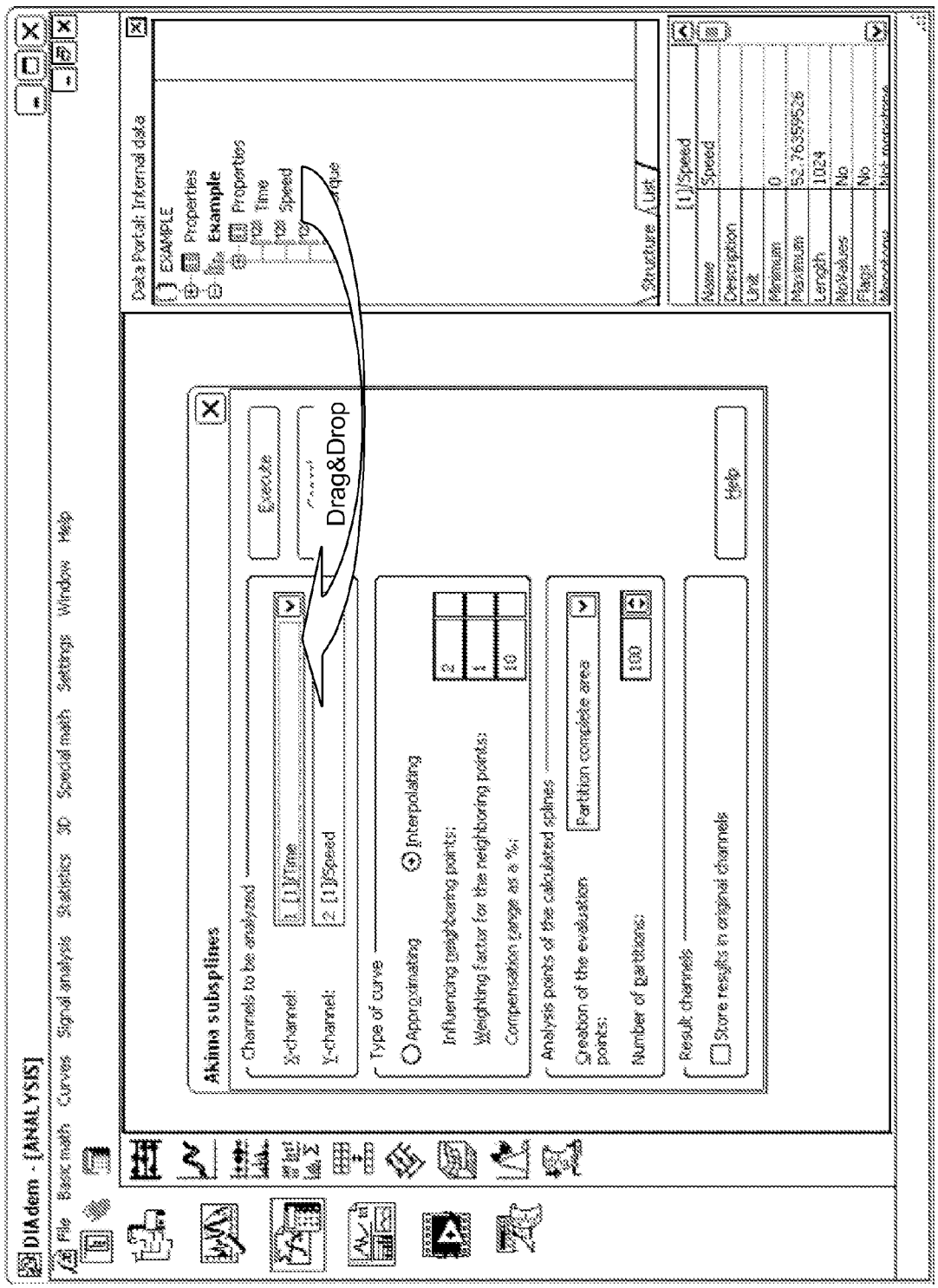
FIG. 15 illustrates a graphical user interface for a browser control according to one embodiment.
Figure 16:
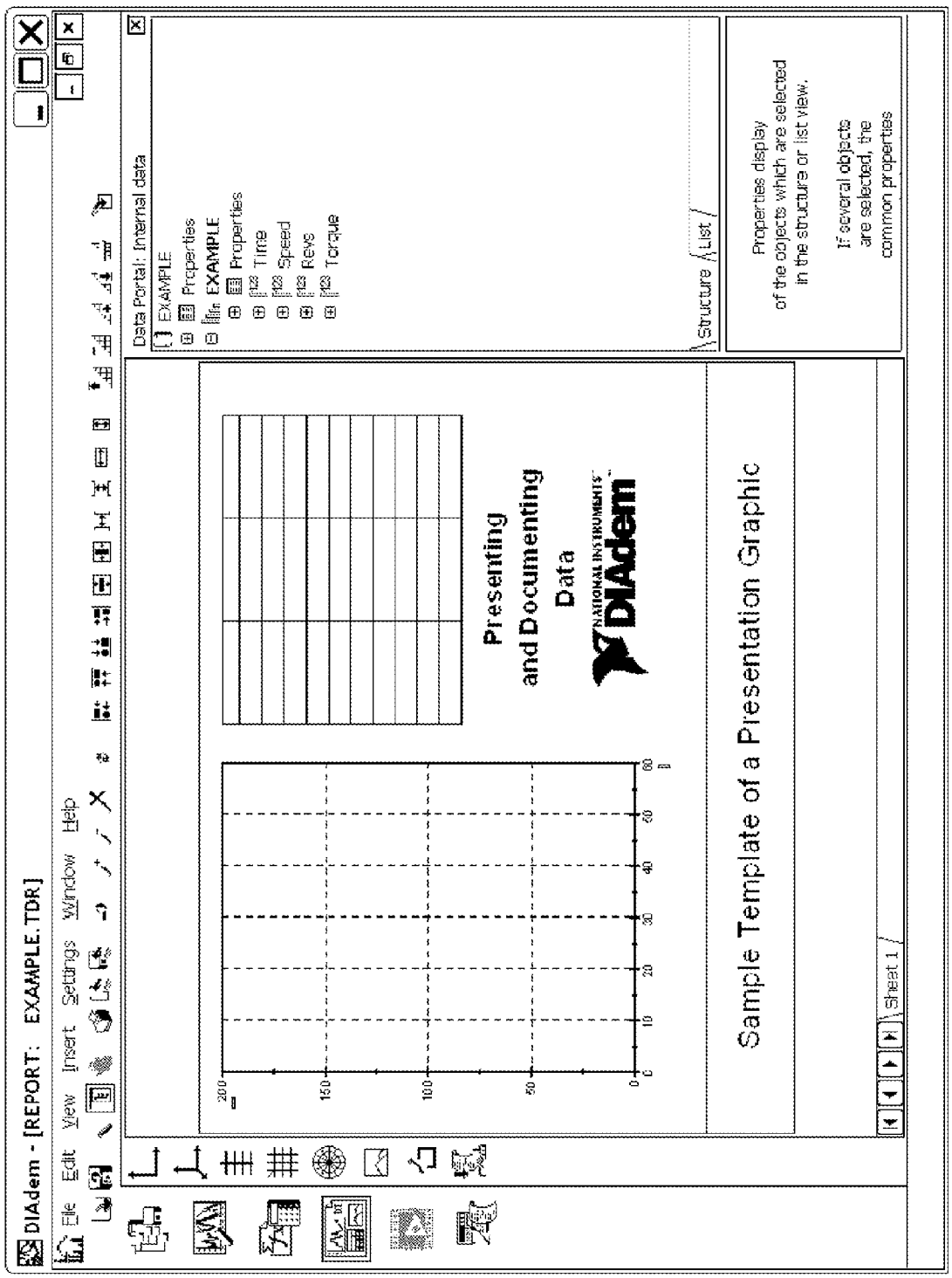
FIG. 16 illustrates a graphical user interface for a data plot of measurement data according to one embodiment.

In FIG. 15, a user interface is illustrated which performs a numerical analysis on selected channels in a browser control, in some embodiments. In FIG. 16, a user interface is illustrated which may display a graphical plot of numerical measurement data, in certain embodiments. The data for the plot may be selected from data channels available for browsing, as described above.

Figure 17:
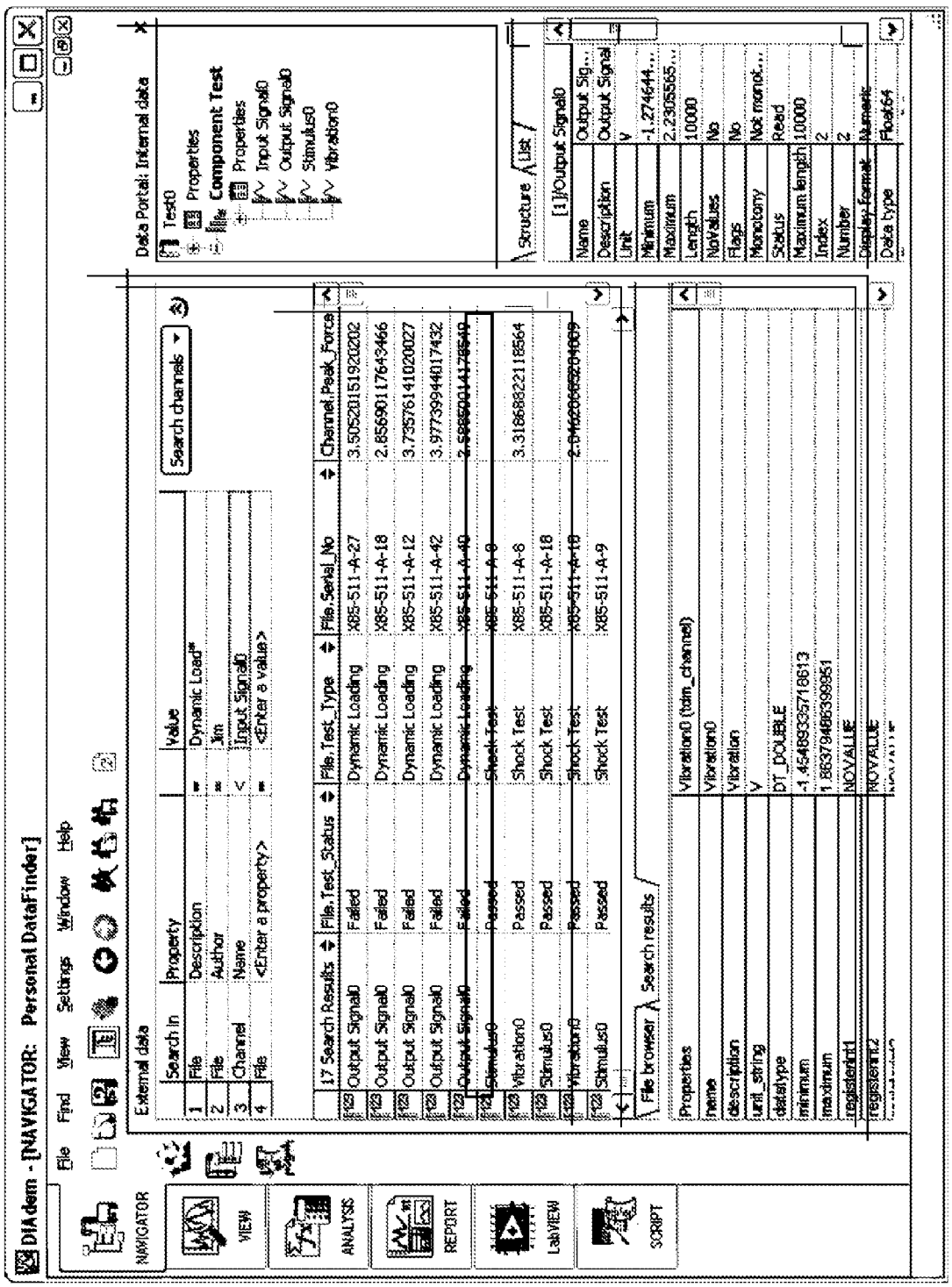
FIG. 17 illustrates a graphical user interface for a browser control with interactive search results according to one embodiment.

In FIG. 17, a further user interface panel is illustrated which illustrates how different search criteria may be interactively applied and intermingled with browsing of measurement data in a data store. The functionality the presently described methods provide for measurement data enable similar search capabilities as well-known search engines have provided for general information search on the Internet. In particular, coping with the volume of data generated in today's test environments presents numerous challenges within an enterprise system, including losing important data and spending excessive time analyzing and reporting data. In one example embodiment, a DIAdem DataFinder may provide the ability to locate data faster, and the ability to search for patterns and trends that were not previously possible when data was saved in flat files scattered across the enterprise. By adopting the TDM file format and tools such as the DIAdem DataFinder, the value of data collected within an enterprise system may be increased and a dramatic impact on measurement data processing activities may be realized, including shortening the product development cycle.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:
1. A method for associating a plug-in with a data file, the method comprising:
    storing measurement data in a data file in an enterprise system, wherein said storing measurement data includes storing meta-data associated with the measurement data, wherein the meta-data describes characteristics of the measurement data;

identifying a plurality of plug-ins for extracting the meta-data from the data file;

for each respective one of the plurality of plug-ins, performing an attempt to extract the meta-data from the data file using the respective plug-in, wherein a successful attempt comprises receiving the meta-data from the respective plug-in of the plurality of plug-ins;

associating a first plug-in from said plurality of plug-ins with the data file based on said performing, in response to a successful attempt using the first plug-in; and identifying the data format of the data file, wherein the data format is determined by the data format associated with the first plug-in.

2. The method of claim 1, wherein an unsuccessful attempt comprises receiving an error message from the respective plug-in.

3. The method of claim 1, further comprising:
retrieving the descriptive information from the meta-data of the data file by the first plug-in; and
storing the descriptive information in a meta-data database index by the first plug-in.

4. The method of claim 1, further comprising:
retrieving the descriptive information from the meta-data of the data file by the first plug-in; and
storing the descriptive information in a meta-data text index by the first plug-in.

5. The method of claim 1, wherein two or more of the plurality of plug-ins are associated with the data file, in response to two or more respective successful attempts.

6. A computer system comprising:
a memory;
a processor; and
computer-readable code stored on said memory and processable by said processor, said computer-readable code including instructions for causing said processor to:
store measurement data in a data file in an enterprise system, wherein said storing measurement data includes storing meta-data associated with the measurement data, wherein the meta-data describes characteristics of the measurement data;
identify a plurality of plug-ins associated with a data format of the data file;
for each respective one of the plurality of plug-ins, perform an attempt to extract the meta-data from the data file using the respective plug-in, wherein a successful attempt comprises receiving the meta-data from the respective plug-in of the plurality of plug-ins;
associate a first plug-in from said plurality of plug-ins with the data file based on said performing, in response to a successful attempt using the first plug-in; and
validate the data format of the data file based on the successful attempt, wherein the data format is validated based on the data format being associated with the first plug-in.

7. The system of claim 6, wherein an unsuccessful attempt comprises receiving an error message from the respective plug-in.

8. The system of claim 6, wherein the data format is at least determined by a file extension in said identifying the plurality of plug-ins.

9. A non-transitory computer-readable memory medium comprising program instructions executable to:
store measurement data in a data file in an enterprise system, wherein said storing measurement data includes storing meta-data associated with the measurement data, wherein the meta-data describes characteristics of the measurement data;
identify a plurality of plug-ins for extracting the meta-data from the data file;
for each respective one of the plurality of plug-ins, perform an attempt to extract the meta-data from the data file using the respective plug-in, wherein a successful attempt comprises receiving the meta-data from the respective plug-in of the plurality of plug-ins;
associate a first plug-in from said plurality of plug-ins with the data file based on said performing, in response to a successful attempt using the first plug-in; and
identify the data format of the data file, wherein the data format is determined based on the data format being associated with the first plug-in.

10. The non-transitory computer-readable memory medium of claim 9, further comprising program instructions executable to:
retrieve the descriptive information from the meta-data of the data file by the first plug-in; and
store the descriptive information in a meta-data database index by the first plug-in.

11. The non-transitory computer-readable memory medium of claim 9, further comprising program instructions executable to:
retrieve the descriptive information from the meta-data of the data file by the first plug-in; and
store the descriptive information in a meta-data text index by the first plug-in.

12. The non-transitory computer-readable memory medium of claim 9, wherein two or more of the plurality of plug-ins are associated with the data file, in response to two or more respective successful attempts.

13. A method for associating a plug-in with a data file, the method comprising:
storing measurement data in a data file in an enterprise system, wherein said storing measurement data includes storing meta-data associated with the measurement data, wherein the meta-data describes characteristics of the measurement data;
identifying a plurality of plug-ins associated with a data format of the data file;
performing a plurality of attempts to extract the meta-data from the data file using the plurality of plug-ins, wherein a successful attempt comprises receiving the meta-data from a plug-in of the plurality of plug-ins;
associating at least one first plug-in from said plurality of plug-ins with the data file based on said performing, in response to at least one successful attempt using the at least one first plug-in; and
validating the data format of the data file based on the successful attempt, wherein the data format is validated by the data format associated with the at least one first plug-in.

14. The method of claim 13,
wherein said validating the data format of the data file includes the respective plug-in successfully reading the contents of the data file.

15. The method of claim 1, wherein said identifying the data format of the data file comprises identifying a file type of the data file, wherein the file type is determined by the file type associated with the first plug-in.

16. The non-transitory computer-readable memory medium of claim 9, wherein said identifying the data format of the data file comprises identifying a file type of the data file, wherein the file type is determined by the file type associated with the first plug-in.

17. The method of claim 13, wherein said identifying the plurality of plug-ins associated with the data format of the data file comprises identifying the plurality of plug-ins associated with a file type of the data file, wherein said validating the data format of the data file comprises validating the file type of the data file, wherein the file type is validated by the file type associated with the at least one plug-in.

* * * * *